US012677927B1

(12) United States Patent　　　　　　(10) Patent No.:　US 12,677,927 B1

D'Amico et al.　　　　　　　　　　　　(45) Date of Patent:　　　Jul. 14, 2026

(54) COSMETIC CONTAINER WITH PROTECTION AGAINST UV-LIGHT

(71) Applicant: NEXDOT, Romainville (FR)

(72) Inventors: Michele D'Amico, Romainville (FR); Yu-Pu Lin, Romainville (FR); Claire Wroblewski, Romainville (FR); Benoît Dubertret, Romainville (FR)

(73) Assignee: NEXDOT, Romainville (FR)

( * ) Notice: Subject to any disclaimer, the term of this patent is extended or adjusted under 35 U.S.C. 154(b) by 0 days.

(21) Appl. No.: 19/375,411

(22) Filed: Oct. 31, 2025

(30)　　　Foreign Application Priority Data

Mar. 14, 2025　(EP) ..................................... 25305347
May 23, 2025　(FR) ..................................... 2505557

(51) Int. Cl.
　　*A45D 34/00*　　　(2006.01)
　　*A61G 13/00*　　　(2006.01)
　　*A61Q 13/00*　　　(2006.01)
　　*B65D 23/08*　　　(2006.01)
　　*G02F 1/00*　　　(2006.01)

(52) U.S. Cl.
　　CPC ............. *A45D 34/00* (2013.01); *A61G 13/00* (2013.01); *B65D 23/0821* (2013.01); *G02F 1/0063* (2013.01); *A45D 2200/053* (2013.01); *G02F 2201/086* (2013.01)

(58) Field of Classification Search
　　CPC ........ A45D 34/00; A61Q 13/00; B65D 23/08; G02F 1/00
　　USPC ............................................................. 512/1
　　See application file for complete search history.

*Primary Examiner* — Jessica Whiteley

(74) *Attorney, Agent, or Firm* — Bochner PLLC; Andrew D. Bochner

(57)　　　　　　　ABSTRACT

The present invention relates to a perfume bottle coated with a filtering film allowing protection of aroma compounds sensitive to UV-light.

20 Claims, 5 Drawing Sheets

COSMETIC CONTAINER WITH PROTECTION AGAINST UV-LIGHT

FIELD OF INVENTION

The present invention relates to the field of UV protection, in particular for cosmetic formulations and fragrances.

BACKGROUND OF INVENTION

It is common knowledge that UV light can have deleterious effects on various commercial products, such as cosmetic formulations and fragrances. In particular, UV light can degrade the odorous compounds.

To limit such degradation, photo-stabilizers are currently added to the cosmetic products and fragrances. International patent application WO2009/059872 discloses addition of a benzotriazole compound in a fragrancing composition to keep stable the organoleptic properties of the product. Besides benzotriazole compounds, avobenzone, octocrylene and methoxycinnamate derivatives—especially ethylhexyl methoxycinnamate, which is banned form cosmetic products in some countries—are commonly used.

These photo-stabilizers present various drawbacks. Indeed, upon absorption of UV light, they tend to degrade, thereby modifying the composition of the cosmetic formulation or fragrance. The degradation products often lead to change of composition-assessed by Gas Phase Chromatography (GPC)—which is also related to changes in odour-assessed by sensory analysis—and/or colour—assessed by UV-visible spectrometry. Moreover, the protection decreases over time as photo-stabilizers degrade.

In addition, some degradation products of these photo-stabilizers are considered to have deleterious effects on human health, sea life and environment.

There is thus a need to provide protection for cosmetic formulations or fragrances with less photo-stabilizers, or even without photo-stabilizers.

The Applicant has found that these needs could be met with filtering films having a specific absorbance in a range of wavelength where light has a strong interaction with conjugated compounds, such as α,β-unsaturated carbonyl compounds, conjugated terpenes or conjugated terpenoids.

SUMMARY

The present disclosure relates to a perfume bottle comprising
- a glass container,
- a fragrancing composition in the glass container, said fragrancing composition comprising at least:
  - i. 100 ppm of aroma compounds having an α,β-unsaturated carbonyl functional group, or
  - ii. 50 ppm of aroma compounds being conjugated terpenes or conjugated terpenoids,
- a filtering film on the glass container, said filtering film comprising compounds absorbing UV-light in a range from 300 nm to 380 nm and a binder, wherein the weighted mean absorbance $A_{380}$ of the filtering film is greater than 2, preferably greater than 2.5, with $A_{380}$ defined by the following relation:

$$A_{380} = \frac{\int_{300}^{380} W(\lambda)A(\lambda)d\lambda}{\int_{300}^{380} W(\lambda)d\lambda}$$

where $A(\lambda)$ represents the absorbance of the filtering film at a given wavelength, and $W(\lambda)$ represents a weighting function equal to the product of the solar spectrum irradiance $E_S(\lambda)$ and a sensitivity function $S(\lambda)$ defined as a gaussian function with the peak centered at 300 nm and a standard deviation of 24 nm.

In an embodiment, the aroma compound is selected from the group consisting of cinnamaldehyde, α-amylcinnamaldehyde, α-hexylcinnamaldehyde, citral, 4-anisaldehyde, benzaldehyde, 4-isopropylbenzaldehyde, piperonal, vanillin, carvone, α-damascone, β-damascenone, α-ionone, β-ionone, γ-ionone, α-isomethylionone, jasmone, oct-1-en-3-one, and their mixtures. More specifically, the aroma compound is selected from the group consisting of citral, α-damascone, α-isomethylionone, β-ionone, cinnamaldehyde, α-farnesene, germacrene D, α-phellandrene.

In an embodiment, the fragrancing composition comprises less than 500 ppm of photo-stabilizers.

In an embodiment, the concentration of α,β-unsaturated carbonyl functional groups in the fragrancing composition is greater than or equal to 0.05 mmol·kg$^{-1}$.

In an embodiment, the concentration of unsaturations in conjugated terpenes or conjugated terpenoids in the fragrancing composition is greater than or equal to 0.03 mmol·kg$^{-1}$.

In an embodiment, the weighted mean absorbance $A_{340}$ of the filtering film is greater than 2, preferably greater than 2.5, with $A_{340}$ defined by the following relation:

$$A_{340} = \frac{\int_{300}^{340} W(\lambda)A(\lambda)d\lambda}{\int_{300}^{340} W(\lambda)d\lambda}$$

In an embodiment, the compounds absorbing UV-light comprise semi-conductive nanoparticles having a formula $$M_xE_y \tag{I},$$

wherein:
M is selected from the group consisting of Zn, Cd, Hg, Cu, Ag, Al, Ga, In, Si, Ge, Sn, Pb and a mixture thereof;
E is selected from the group consisting of S, Se, Te, N, P, As, Sb, and a mixture thereof;
x and y are independently a decimal number from 0.5 to 5.

In an embodiment, the semi-conductive nanoparticles in the filtering film are present in an amount that is in a range from 0.05 wt % to 15 wt %, based on the weight of the filtering film, for a 10 µm-thick film.

In an embodiment, the compounds absorbing UV-light comprise organic anti-UV compounds selected from the group consisting of benzotriazoles, triazines, piperidines, benzophenones, catechol, their derivatives, and mixtures thereof.

In an embodiment, the organic compounds absorbing UV-light in the filtering film are present in an amount that is in a range from 2 wt % to 25 wt %, preferably from 0.5 wt % to 15 wt %, based on the weight of the filtering film, for a 10 µm-thick film.

In an embodiment, the filtering film is transparent, preferably transparent and uncoloured.

In an embodiment, the perfume bottle is transparent, preferably transparent and uncoloured.

In an embodiment, the difference of lightness between the cosmetic bottle and the container is lower than 5, optionally the Chroma of the cosmetic bottle is lower than 60, preferably lower than 50.

In an embodiment, the fragrancing composition is a perfume, an esprit de parfum, an eau de parfum, or an eau de toilette.

Definitions

In the present invention, the following terms have the following meanings:

"Absorbance" is the decimal logarithm of ratio $I_0/I$, where $I_0$ is the intensity of light incident on a sample and I is the intensity of light transmitted through said sample. In this disclosure, absorbance is measured for wavelengths in UV and visible range from 350 nm to 780 nm. For solid samples (coating), absorbance is measured for a 5-micrometer-thick sample. For liquid samples (solutions of absorbing compound), absorbance is measured in a 1-centimeter light path cuvette. Absorbance of 1 means that 9 out of 10 photons are absorbed by the sample. Absorbance of 0.3 means that 1 out of 2 photons is absorbed by the sample.

"Aldehydes" refer to compounds $RC(=O)$ H, in which a carbonyl group is bonded to one hydrogen atom and to one R group, R being an alkyl group, an aryl group or an arylalkyl group.

"Alkyl" refers to any saturated linear or branched hydrocarbon chain, with 3 to 15 carbon atoms. The alkyl group may be substituted.

"Aryl" refers to a mono- or polycyclic system of 5 to 20, and preferably 6 to 12, carbon atoms having one or more aromatic rings (when there are two rings, it is called a biaryl) among which it is possible to cite the phenyl group, the biphenyl group, the 1-naphthyl group, the 2-naphthyl group, the tetrahydronaphthyl group, the indanyl group and the binaphthyl group. The term aryl also means any aromatic ring including at least one heteroatom chosen from an oxygen, nitrogen or sulfur atom. The aryl group can be substituted by 1 to 3 substituents chosen independently of one another, among a hydroxyl group, a linear or branched alkyl group, an adhehyde group, methylenedioxy, ethylenedioxy, COOR (where R and R' are each independently selected from the group consisting of H and alkyl), a second aryl group which May be substituted as above.

"Arylalkyl" refers to an alkyl group substituted by an aryl group.

"α,β-unsaturated carbonyl" refers to the functional group $(C=C)C(=O)$, in which a carbonyl group is in vicinal position with an unsaturated carbon-carbon link.

"Chroma" refers to the radial coordinate of a colour in CIE L*a*b* model. As chroma increases, the saturation of colour increases. On the opposite, a low chroma correspond to a pale colour. In particular, chroma of white colour is zero.

"Color space": refers to a model for representation of color perceived by observers. In this disclosure, Color space refers to the CIE L*a*b* color space—also known as L*a*b*—defined by the International Commission on Illumination (CIE) in 1976. In CIE L*a*b*, a colour is represented by lightness (L*), position between red and green (a*) and position between yellow and blue (b*). Within this model, all colours for a given lightness can be represented within a circle, in which a* and b* are coordinates of colours.

"Colorimetric coefficients": refer to chroma and hue of a colour, in the international colorimetric system CIE L*a*b* (1976), and are calculated between 380 and 780 nm, taking the standard illuminant D65 and the observer into account (angle of 2°). The observer is a "standard observer" as defined in the international colorimetric system CIE L*a*b*.

"Conjugated" refers to chemical compounds comprising a system of connected p-orbitals with delocalized electrons. Such conjugated systems may be two or more carbon-carbon double bonds separated by a single carbon-carbon bond— i.e., alternating single and double bonds. Such conjugated systems may be α,β-unsaturated carbonyl functional groups.

"Fragrancing composition": refers to any composition intended to provide a scent, a fragrance. In particular, a fragrancing composition may be a perfume, an esprit de parfum, an eau de parfum, an eau de toilette, or a Cologne. Other fragrancing compositions are broadly known as cosmetics, fabric car products or household products.

"Hue": refers to the angular coordinate of a colour in CIE L*a*b* model. Hue is an indication of colour perceived as red, orange, yellow, green, blue or purple.

"Ketones" refer to compounds $R1C(=O)R2$, in which a carbonyl group is bonded to two R groups, similar or different, being an alkyl group, an aryl group or an arylalkyl group.

"Lightness"; refers to the absolute brightness value of light. In CIE LAB colorimetric space, Lightness ranges from L*=0 (black) to L*=100 (diffuse white).

"Luminous transmission": refers to an average in the 380-780 nm wavelength range that is weighted according to the sensitivity of the eye at each wavelength of the range and measured under D65 illumination conditions (daylight), as defined in the standard ISO 13666:1998.

"Terpenes" are chemical compounds with a formula $(C_5H_8)_n$ for $n \geq 2$.

"Terpenoids" are compounds whose backbone is a terpene, but also containing an additional functional group, such as an alcohol, an aldehyde, a ketone or an ester.

"Transparent" refers to a material with two properties. First, light scattering by the material should be low, typically below 1% as measured with standard haze measurement according to ASTM D1003-00, preferably below 0.8%, even preferably below 0.5%. Second, the shape of an object seen throughout the material should be unaltered, in the sense that a consumer can recognize an object when looking through the material. In this disclosure, transparency is not related to the absorbance of visible light: a material may be transparent and coloured. Optionally, the material is uncoloured when the absorbance of the material is less than 0.05 for a range of wavelength from 420 nm to 780 nm, preferably from 400 nm to 780 nm, more preferably for the whole visible range: from 380 nm to 780 nm. With such low absorbance, there is no attenuation effect visible by eye, nor change in colour perception: the material is transparent and uncoloured. The material may be a glass container, a plastic container or a film.

"wt %" refers to the weight percentage of a component in a blend or a formulation, based on the weight of the solid blend—after drying or cure, as the case may be.

DETAILED DESCRIPTION

This disclosure relates to a cosmetic bottle, in particular a perfume bottle.

Cosmetic Bottle

The cosmetic bottle comprises a container, in particular a glass container. The composition of glass and the shape of the glass container may vary according to the usual practices in cosmetic bottles manufacturing. In an embodiment, the glass container is transparent and uncoloured—often referred as white glass in the industry. Alternatively, the glass container may be coloured—evenly or with patterns or images. Notwithstanding its colour, a glass container may require protection against UV-light. In another embodiment, the container may be a plastic container, optionally a transparent and uncoloured plastic container. Polycarbonate containers are suitable transparent and uncoloured plastic containers. Plastic containers are less preferred over glass containers because the additives generally used in plastics—potentially harmful for health and/or environment—may be extracted from the plastic container by the cosmetic composition contained therein.

Cosmetic Composition

The cosmetic bottle comprises a cosmetic composition in the container. The cosmetic composition may be a cleansing composition, a conditioning composition, a make-up or a fragrancing composition for instance.

In an embodiment, the cosmetic composition is a fragrancing composition for caring for or treating skin, and may especially be in the form of an eau fraiche, an eau de toilette, an eau de parfum, an aftershave lotion, a care lotion, a silicone-based or hydrosilicone-based care oil, hygiene products such as shower gels, bath products, shampoos or scrubs. It may also be in the form of a fragrancing two-phase or three-phase lotion.

Aroma Compounds

The cosmetic composition comprises aroma compounds. Said aroma compounds are selected from compounds having an α,β-unsaturated carbonyl functional group, or from conjugated terpenes or from conjugated terpenoids. In the case of compounds having an α,β-unsaturated carbonyl functional group, the chemical unsaturation may be a simple carbon-carbon double bond—potentially conjugated with other double bonds—or may be included in a broader aromatic structure. Such aroma compounds may be aldehydes or ketones. The protection of said aroma compounds is especially important because these aroma compounds are very often head notes, giving the first olfactory impression of the fragrancing composition. Alteration of these head notes is therefore quickly perceived by consumers as a degradation of the fragrancing composition.

In an embodiment, the compounds having α,β-unsaturated carbonyl functional group do not comprise a ketone conjugated with an aromatic structure, such compounds being rarely aroma compounds. It is also clear that aroma compounds do not comprise chemicals intended to induce a reaction after absorption of light, such as photo initiators-especially type I photo initiators undergoing scission—, photocatalysts or photopolymerizable monomers. Preferably, the fragrancing composition does not comprise compounds selected from the group consisting of: compounds having an α,β-unsaturated carbonyl functional group in the form of a ketone conjugated with an aromatic structure; photo initiators; photocatalysts or photopolymerizable monomers.

The aroma compounds having an strong absorption in the range of wavelength from 300 nm to 320 nm are especially relevant in this disclosure, as they are not well protected by known solutions, whereas the filtering films here disclosed have an efficient effect.

The concentration of aroma compounds having an α,β-unsaturated carbonyl functional group in the cosmetic composition is greater than or equal to 100 ppm. Indeed, the degradation products of these aroma compounds lead to negative sensory effects—in odour or in colour or both—if they reach a threshold concentration for detection by a user. It has been determined that such a threshold may be reached when the initial concentration in aroma compounds of the cosmetic composition is greater than or equal to 100 ppm.

Alternatively, the content of the cosmetic composition in α,β-unsaturated carbonyl functional group may be defined in moles by kilogram of composition. In an embodiment, the concentration of α,β-unsaturated carbonyl functional groups in the cosmetic composition is greater than or equal to 0.05 $mmol \cdot kg^{-1}$.

The concentration of aroma compounds being conjugated terpenes or conjugated terpenoids in the cosmetic composition is greater than or equal to 50 ppm. Indeed, the degradation products of these aroma compounds lead to negative sensory effects—in odour or in colour or both—if they reach a threshold concentration for detection by a user. It has been determined that such a threshold may be reached when the initial concentration in aroma compounds of the cosmetic composition is greater than or equal to 50 ppm.

Alternatively, the content of the cosmetic composition in conjugated terpenes or conjugated terpenoids may be defined in moles of unsaturation by kilogram of composition. This measure is analogous to iodine value. In an embodiment, the concentration of unsaturations in conjugated terpenes or conjugated terpenoids in the cosmetic composition is greater than or equal to 0.03 $mmol \cdot kg^{-1}$.

Examples of aldehydes with simple carbon-carbon double bond are cinnamaldehyde, α-amylcinnamaldehyde, αβ-hexylcinnamaldehyde, citral.

Examples of aldehydes linked with aromatic structures are 4-anisaldehyde, benzaldehyde, 4-isopropylbenzaldehyde, piperonal, vanillin.

Examples of ketones with simple carbon-carbon double bond are carvone, α-damascone, β-damascenone, ionone—in alpha, beta or gamma form—, α-isomethylionone, α-n-methylionone, jasmone, oct-1-en-3-one.

In an embodiment, aroma compounds having an α,β-unsaturated carbonyl functional group are selected from the group consisting of citral, α-damascone, α-isomethylionone, beta-ionone, cinnamaldehyde.

In an embodiment, aroma compounds being conjugated terpenes are farnesene—in alpha or beta structure—, germacrene C, germacrene D, ocimene, phellandrene—in alpha or beta structure—, α-terpinene.

In an embodiment, the cosmetic composition is a fragrancing composition comprising at least 40 wt % of ethanol, preferably 50% wt of ethanol.

In an embodiment, the disclosure relates to a perfume bottle, said bottle comprising a glass container filled with a fragrancing composition.

In particular, the disclosure relates to perfume bottle, said bottle comprising a glass container, filled with an eau de toilette composition, said composition comprising at least 100 ppm of aroma compounds having an α,β-unsaturated carbonyl functional group or comprising at least 50 ppm of aroma compounds being conjugated terpenes or conjugated terpenoids.

More specifically, the disclosure relates to a perfume bottle, said bottle comprising a glass container, filled with an eau de parfum composition, said composition comprising at least 250 ppm of aroma compounds having an α,β-unsaturated carbonyl functional group or comprising at least 125 ppm of aroma compounds being conjugated terpenes or conjugated terpenoids. In a variant, said composition comprises at least 0.12 mmol $kg^{-1}$ of aroma compounds having an α,β-unsaturated carbonyl functional group or comprises at least 0.1 $mmol \cdot kg^{-1}$ of aroma compounds being conjugated terpenes or conjugated terpenoids.

More specifically, the disclosure relates to a perfume bottle, said perfume bottle comprising a glass container, filled with a perfume composition, said composition comprising at least 1000 ppm of aroma compounds having an $\alpha,\beta$-unsaturated carbonyl functional group or comprising at least 500 ppm of aroma compounds being conjugated terpenes or conjugated terpenoids. In a variant, said composition comprises at least 0.5 mmol kg$^{-1}$ of aroma compounds having an $\alpha,\beta$-unsaturated carbonyl functional group or comprises at least 0.3 mmol·kg$^{-1}$ of aroma compounds being conjugated terpenes or conjugated terpenoids.

Weighted Mean Absorbance:

Carbonyl functional groups shear a common feature in terms of UV light interaction: they can absorb a UV photon to promote an electron from n state of the oxygen of carbonyl bond into a non-bonding $\pi^*$ state of the carbonyl bond, thus lowering carbonyl bond energy and allowing reaction of the carbonyl function—for instance oxidation, or formation of lactone or acetal as the case may be. The typical energy involved in such electronic transition corresponds to the range from 280 nm to 290 nm UV-light. This range of UV light is not encountered naturally in sunlight—it is filtered out by atmosphere. However, when the carbonyl function is associated with an $\alpha,\beta$-unsaturation—in a conjugate structure then, either ethylenic or aromatic—the energy required for transition of electron from n state to $\pi^*$ state is lowered, in such a way that UV light in a range from 300 nm to 340 nm becomes source of degradation. This range of UV-light is present in natural sunlight, though in small quantities.

Glass readily absorbs a part of UV light in a range from 300 nm to 340 nm. The efficiency of absorption is directly correlated with glass thickness. Though, a trend in industry is to limit the weight of packaging, leading to a decrease in glass thickness for glass containers.

Plastic containers are usually degraded by UV light in a range from 300 nm to 340 nm, due to formation of free radicals. Therefore, plastic containers are protected by photo-stabilizers and/or free radical scavengers, the latter being potentially extracted by the cosmetic composition, especially for alcoholic or hydroalcoholic solvents.

In this disclosure, the container of the cosmetic bottle is coated with a filtering film, said filtering film comprising compounds absorbing UV-light in a range from 300 nm to 380 nm and a binder, wherein the weighted mean absorbance $A_{380}$ of the filtering film is greater than 2, preferably greater than 2.5, with $A_{380}$ defined by the following relation:

$$A_{380} = \frac{\int_{300}^{380} W(\lambda)A(\lambda)d\lambda}{\int_{300}^{380} W(\lambda)d\lambda}$$

where $A(\lambda)$ represents the absorbance of the filtering film at a given wavelength, and $W(\lambda)$ represents a weighting function equal to the product of the solar spectrum irradiance $E_S(\lambda)$—which can be found in ASTM G177-03 (2012) standard—and a sensitivity function $S(\lambda)$ Various analysis run by the applicant have shown that aroma compounds often used in fragrances—devoid of photo-stabilizers—present similar absorption spectra in UV-light, as shown in FIG. 2—for diluted fragrances. Indeed, notwithstanding some variations in amplitude, absorbance may be fitted with a gaussian function having its peak centered at 300 nm and a standard deviation of 24 nm—the right side of a gaussian function actually. Therefore, throughout the following disclosure, the sensitivity function $S(\lambda)$ is defined as a gaussian function with the peak centered at 300 nm and a standard deviation of 24 nm. The values considered in the present disclosure are presented in the following table:

TABLE I

| Wavelength (nm) | Solar spectrum irradiance $E_S(\lambda)$ (mW/m$^2 \cdot$ nm) | Sensitivity $S(\lambda)$ | Weighting fonction $W(\lambda)$ |
|---|---|---|---|
| 300 | 0.081 | 1.000 | 0.081 |
| 305 | 1.91 | 0.979 | 1.869 |
| 310 | 11 | 0.917 | 10.088 |
| 315 | 30 | 0.823 | 24.694 |
| 320 | 54 | 0.707 | 38.205 |
| 325 | 79.2 | 0.582 | 46.123 |
| 330 | 101 | 0.459 | 46.366 |
| 335 | 128 | 0.347 | 44.360 |
| 340 | 151 | 0.251 | 37.834 |
| 345 | 170 | 0.173 | 29.491 |
| 350 | 188 | 0.115 | 21.624 |
| 355 | 210 | 0.073 | 15.338 |
| 360 | 233 | 0.044 | 10.349 |
| 365 | 253 | 0.026 | 6.544 |
| 370 | 279 | 0.014 | 4.025 |
| 375 | 306 | 0.008 | 2.358 |
| 380 | 336 | 0.004 | 1.324 |

The value of weighted mean absorbance $A_{380}$ greater than 2—which means that 99% of photons in the range of 300 nm to 380 nm are absorbed by the film—has proven beneficial in ageing test presented below in examples. Indeed, a commercial filtering solution with $A_{380}$ equal to 1.8 was not satisfactory, whereas filtering film disclosed in example 4 with $A_{380}$ equal to 2.4 was satisfactory.

In an embodiment, the weighted mean absorbance $A_{380}$ is greater than 2.5, preferably greater than 3. Greater values for $A_{380}$ are possible, for instance greater than 4, or 5.

Even if the weighting function $W(\lambda)$ gives a more important role to the absorption in the range of wavelength from 300 nm to 340 nm, the contribution in higher wavelength is not negligible. In an embodiment, the filtering film presents a weighted mean absorbance $A_{340}$ greater than 2, with $A_{340}$ defined by the following relation:

$$A_{340} = \frac{\int_{300}^{340} W(\lambda)A(\lambda)d\lambda}{\int_{300}^{340} W(\lambda)d\lambda}$$

where the functions have the same definitions as hereabove for $A_{380}$. Indeed, $A_{340}$ is more focused on the range of wavelength associated with $\alpha,\beta$-unsaturated carbonyl functional group of aroma compounds and provides a better characterization of filtering effect. A weighted mean absorbance $A_{340}$ greater than 2 means that 99% of photons in the range of 300 nm to 340 nm are absorbed by the film. In an embodiment, the weighted mean absorbance $A_{340}$ is greater than 2.5, preferably greater than 3. Greater values for $A_{340}$ are possible, for instance greater than 4 or 5. In addition, the mostly used photo-stabilizer avobenzone has a peak of absorption around 350 nm, with less absorption in the range of wavelengths rom 300 nm to 340 nm where degrading effects on $\alpha,\beta$-unsaturated carbonyl functional group is believed to be stronger. Thus; $A_{340}$ appears as a very relevant parameter to characterize the filtering film of this disclosure.

The filtering film disclosed hereabove allows lowering the concentration of photo-stabilizers to be included in the cosmetic composition, even avoiding such addition of photo-stabilizers.

In an embodiment, the cosmetic composition, and more specifically the fragrancing composition, comprises less than 500 ppm of photo-stabilizers. In particular, the cosmetic composition, and more specifically the fragrancing composition, comprises less than 150 ppm of avobenzone and/or less than 150 ppm of octocrylene and/or less than 150 ppm of methoxycinnamate and their derivatives-especially ethylhexyl methoxycinnamate. This approach allows combining the protection effects of the filtering film and the photo-stabilizers, but with a much lower concentration than current use. Indeed, it has been observed that some aroma compounds are better protected by photo-stabilizers than filtering films. Therefore, the following combinations of filtering film (value of $A_{380}$) and photo-stabilizers (maximum composition in ppm) are suitable: 2/500; 2.4/500; 2.4/300; 2.8/500; 2.8/300; 2.8/150; 3.2/500; 3.2/300; 3.2/150; 3.2/75; 3.6/500; 3.6/300; 3.6/150; 3.6/75; 3.6/40.

In an embodiment, the cosmetic composition, and more specifically the fragrancing composition, is devoid of photo-stabilizers. In particular, the cosmetic composition, and more specifically the fragrancing composition, is devoid of avobenzone, octocrylene and methoxycinnamate and their derivatives-especially ethylhexyl methoxycinnamate. By devoid, it is here meant that the photo-stabilizers are not intentionally added in the cosmetic composition. Some minor traces of photo-stabilizers may still be present due to impurities in the other components of the cosmetic composition.

Compounds Absorbing UV-Light:

In the disclosure, the filtering film comprises compounds absorbing UV-light, which may be of various types.

Semi-Conductive Nanoparticles

In an embodiment, compounds absorbing UV-light are semi-conductive nanoparticles. Semi-conductive nanoparticles bring especially interesting light absorbing properties to filtering films comprising them. In particular, with proper selection of composition and structure of semi-conductive nanoparticles, filtering films having a sharp transition between range of absorbed light (of high energy) and range of transmitted light (low energy) may be designed.

Due to their electronic structure, semi-conductive nanoparticles behave as high pass filters: absorbance is high for wavelength of high energy, i.e., short wavelengths. On the contrary, absorbance for wavelength of low energy, i.e., long wavelengths, is low. The transition between both domains of high and low absorbance may be defined by the wavelength $\lambda_{max}$ defined as follow: $\lambda_{max}$ corresponds to the local maximum absorbance of highest wavelength in the range from 300 to 500 nm. It is noteworthy that semi-conductive nanoparticles absorbing UV-A light are also intrinsically absorbing UV-B light. This is a major difference with organic UV-A absorbers which present a peak of absorption, without absorption below and above the peak.

In other words, light of wavelength less than the wavelength $\lambda_{max}$ will not be transmitted whereas light of wavelength greater than the wavelength $\lambda_{max}$ will be transmitted. Advantageously, in the present disclosure, $\lambda_{max}$ is in the range from 320 nm to 360 nm: absorption in the range from 300 nm to 340 nm is thus very efficient to avoid $\alpha,\beta$-unsaturated carbonyl functional group degradation—or conjugated double bonds degradation—, while absorption in visible light is negligible in order to avoid any undesired coloration of the filtering film. Preferably, $\lambda_{max}$ is in the range from 320 nm to 350 nm, more preferably in the range from 320 nm to 340 nm. The wavelength $\lambda_{max}$ of the semi-conductive nanoparticles can be adjusted depending on the composition, shape, dimensions and direct environment of the semi-conductive nanoparticles.

Semi-conductive nanoparticles with higher $\lambda_{max}$ may be desirable to impart some filtering properties to the filtering film in UV-light, or even visible light. For instance, the semi-conductive nanoparticles may have a $\lambda_{max}$ in the range from 350 nm to 400 nm, preferably from 350 nm to 380 nm. The property of semi-conductive nanoparticles to behaves as high pass filters is especially interesting, as all light of wavelength inferior to the wavelength $\lambda_{max}$ is "blocked".

Especially suitable semi-conductive nanoparticles have a formula $$M_x E_y \tag{I},$$

wherein:

M is selected from the group consisting of Zn, Cd, Hg, Cu, Ag, Al, Ga, In, Si, Ge, Sn, Pb or a mixture thereof;

E is selected from the group consisting of S, Se, Te, N, P, As, Sb, or a mixture thereof;

x and y are independently a decimal number from 0 to 5; and x and y are not simultaneously equal to 0.

In a specific embodiment, semi-conductive nanoparticles comprise a material selected from the group consisting of CdS, CdSe, CdTe, ZnS, ZnSe, ZnTe, HgS, HgSe, HgTe, HgO, GeS, GeSe, GeTe, SnS, SnSe, SnTe, PbS, PbSe, PbTe, $GeS_2$, $GeSe_2$, $SnS_2$, $SnSe_2$, $CuInS_2$, $CuInSe_2$, $CuAlS_2$, $CuAlSe_2$, CuInZnS, CuInZnSe, $AgInS_2$, $AgInSe_2$, CuS, $Cu_2S$, $Ag_2S$, $Ag_2Se$, $Ag_2Te$, FeS, $FeS_2$, InP, $Cd_3P_2$, $Zn_3P_2$, CdO, $Al_2O_3$, AlN, AlP, AlAs, AlSb, GaN, GaP, GaAs, GaSb, InN, InP, InAs, InSb, InAsP, or a mixture thereof In this disclosure, semi-conductive nanoparticles may have different shapes, provided that they present a nanometric size leading to confinement of exciton created in the nanoparticle. Semi-conductive nanoparticles may be nanospheres, nanoplates or nanorods.

Semi-conductive nanoparticles may have nanometric sizes in three dimensions, allowing quantum confinement in all three spatial dimensions. Such semi-conductive nanoparticles are for instance nanocubes or nanospheres.

Semi-conductive nanoparticles may have nanometric sizes in two dimensions, the third dimension being larger: quantum confinement is in two spatial dimensions. Such semi-conductive nanoparticles are for instance nanorods, nanowires or nanorings.

Semi-conductive nanoparticles may have a nanometric size in one dimension, the other dimensions being larger: quantum confinement is in one spatial dimension only. Such semi-conductive nanoparticles are for instance nanoplates, nanosheets, nanoribbons or nanodisks. Nanoplates are especially interesting in this disclosure because absorption cross section—i.e., efficiency to capture a photon of incident light on the nanoparticle—is ten times higher than a nanosphere having the same composition and structure. This higher cross section improves significantly absorption.

The exact shape of semi-conductive nanoparticles defines confinement properties; then electronic and optical properties depending on composition of semi-conductive nanoparticle, in particular the band gap, then $\lambda_{max}$ of the final filtering film. It has been also observed that nanoparticles with a nanometric size in one dimension, especially nanoplates, present a sharper transition between both domains of high and low absorbance as compared to nanoparticles with other shapes. Indeed, width of transition zone is enlarged if nanometric size of nanoparticles fluctuates around a mean value. When nanometric size is controlled in only one dimension, i.e. for nanoplates, by a strict number of atomic layers, thickness fluctuations are almost null and transition between absorbing and non-absorbing state is very sharp. This leads to particularly efficient filtering films.

In an embodiment, semi-conductive nanoparticles are homostructures. By homostructure, it is meant that the semi-conductive nanoparticle is homogenous and has the same local composition in all its volume. A homogeneous spherical semi-conductive nanoparticle (1) is illustrated in FIG. 1A.

In an alternative embodiment, semi-conductive nanoparticles are heterostructures. By heterostructure, it is meant that the semi-conductive nanoparticles is comprised of several sub-volumes, each sub-volume having a different composition from neighbouring sub-volumes. In a particular embodiment, all sub-volumes have a composition defined by formula (I) disclosed above, with different parameters, i.e., elemental composition and stoichiometry.

Examples of heterostructure are core/shell nanoparticles, the core (11) having any shape disclosed above. A shell (12) is a layer covering totally or partially the core. A particular example of core/shell heterostructure is a multi-layered structure comprising a core (11) and several successive shells (12, 13). For convenience, these multi-layered heterostructures are named core/shell hereafter. Core (11) and shell (12,13) may have the same shape-sphere in sphere for example- or not-sphere in plate for instance. A core/shell spherical nanoparticle is illustrated in FIG. 1B. A core/shell/shell spherical nanoparticle is illustrated in FIG. 1C. A sphere in plate nanoparticle is illustrated in FIG. 1D—also named a dot in plate. A core/shell nanoplate is illustrated in FIG. 1E.

Another example of heterostructure are core/crown nanoparticles, the core having any shape disclosed above. A crown is a band of material disposed on the periphery of the core. This heterostructure is particularly useful with cores being nanoplates and crown disposed on the edges of the nanoplate. A core/crown nanoplate is illustrated in FIG. 1F.

These heterostructure may have a gradient of composition from the core to the outside of the shell so that there is no precise boundary between core and shell but properties in centre of the core are different from properties on the outer boundary of shell.

In a configuration, semi-conductive nanoparticles are II-VI type and comprise a core based on cadmium, sulfur and selenium and are selected from:

CdSe/CdS, CdSe/CdS/ZnS, CdSe/CdS/ZnSe, CdSe/CdS/ZnSe$_y$S$_{(1-y)}$, CdSe/ZnSe/ZnS, CdSe/ZnSe$_x$S$_{(1-x)}$/ZnS, CdSe$_x$S$_{(1-x)}$/ZnS, CdSe$_x$S$_{(1-x)}$/ZnSe, CdSe$_x$S$_{(1-x)}$/ZnSe$_y$S$_{(1-y)}$, CdSe$_x$Te$_{(1-x)}$/ZnS, CdSe$_x$Te$_{(1-x)}$/ZnSe,

CdSe/Cd$_y$Zn$_{(1-y)}$S, CdSe/Cd$_y$Zn$_{(1-y)}$S/ZnS, CdSe/Cd$_y$Zn$_{(1-y)}$S/ZnSe, CdSe/Cd$_y$Zn$_{(1-y)}$S/ZnSe$_z$S$_{(1-z)}$

CdSe/Cd$_y$Zn$_{(1-y)}$Se, CdSe/Cd$_y$Zn$_{(1-y)}$Se/ZnS, CdSe/Cd$_y$Zn$_{(1-y)}$Se/ZnSe, CdSe/Cd$_y$Zn$_{(1-y)}$Se/ZnSe$_z$S$_{(1-z)}$,

CdSe$_x$S$_{(1-x)}$/CdS, CdSe$_x$S$_{(1-x)}$/CdS/ZnS, CdSe$_x$S$_{(1-x)}$/CdS/ZnSe, CdSe$_x$S$_{(1-x)}$/CdS/ZnSe$_y$S$_{(1-y)}$,

CdSe$_x$S$_{(1-x)}$/Cd$_y$Zn$_{(1-y)}$S, CdSe$_x$S$_{(1-x)}$/Cd$_y$Zn$_{(1-y)}$S/ZnS, CdSe$_x$S$_{(1-x)}$/Cd$_y$Zn$_{(1-y)}$S/ZnSe, CdSe$_x$S$_{(1-x)}$/Cd$_y$Zn$_{(1-y)}$S/ZnSe$_z$S$_{(1-z)}$,

CdSe$_x$S$_{(1-x)}$/Cd$_y$Zn$_{(1-y)}$Se, CdSe$_x$S$_{(1-x)}$/Cd$_y$Zn$_{(1-y)}$Se/ZnS, CdSe$_x$S$_{(1-x)}$/Cd$_y$Zn$_{(1-y)}$Se/ZnSe, CdSe$_x$S$_{(1-x)}$/Cd$_y$Zn$_{(1-y)}$Se/ZnSe$_z$S$_{(1-z)}$, where x, y and z are rational numbers between 0 (excluded) and 1 (excluded).

In a configuration, semi-conductive nanoparticles are II-VI type and comprise a core based on zinc, sulfur and selenium and are selected from:

ZnSe/ZnS, ZnSe/ZnSe$_y$S$_{(1-y)}$, ZnTe/ZnSe$_y$S$_{(1-y)}$

ZnSe$_x$S$_{(1-x)}$/ZnS, ZnSe$_x$S$_{(1-x)}$/ZnSe, ZnSe$_x$S$_{(1-x)}$/ZnSe$_y$S$_{(1-y)}$, ZnSe$_x$Te$_{(1-x)}$/ZnS, ZnSe$_x$Te$_{(1-x)}$/ZnSe, ZnSe$_x$Te$_{(1-x)}$/ZnSe$_x$S$_{(1-x)}$,

ZnSe/Cd$_y$Zn$_{(1-y)}$S, ZnSe/Cd$_y$Zn$_{(1-y)}$S/ZnS, ZnSe/Cd$_y$Zn$_{(1-y)}$S/ZnSe, ZnSe/Cd$_y$Zn$_{(1-y)}$S/ZnSe$_z$S$_{(1-z)}$

ZnSe/Cd$_y$Zn$_{(1-y)}$Se, ZnSe/Cd$_y$Zn$_{(1-y)}$Se/ZnS, ZnSe/Cd$_y$Zn$_{(1-y)}$Se/ZnSe, ZnSe/Cd$_y$Zn$_{(1-y)}$Se/ZnSe$_z$S$_{(1-z)}$,

ZnSe$_x$S$_{(1-x)}$/ZnS, ZnSe$_x$S$_{(1-x)}$/ZnS/ZnSe, ZnSe$_x$S$_{(1-x)}$/ZnS/ZnSe$_y$S$_{(1-y)}$,

ZnSe$_x$S$_{(1-x)}$/Cd$_y$Zn$_{(1-y)}$S, ZnSe$_x$S$_{(1-x)}$/Cd$_y$Zn$_{(1-y)}$S/ZnS, ZnSe$_x$S$_{(1-x)}$/Cd$_y$Zn$_{(1-y)}$S/ZnSe, ZnSe$_x$S$_{(1-x)}$/Cd$_y$Zn$_{(1-y)}$S/ZnSe$_z$S$_{(1-z)}$,

ZnSe$_x$S$_{(1-x)}$/Cd$_y$Zn$_{(1-y)}$Se, ZnSe$_x$S$_{(1-x)}$/Cd$_y$Zn$_{(1-y)}$Se/ZnS, ZnSe$_x$S$_{(1-x)}$/Cd$_y$Zn$_{(1-y)}$Se/ZnSe, ZnSe$_x$S$_{(1-x)}$/Cd$_y$Zn$_{(1-y)}$Se/ZnSe$_z$S$_{(1-z)}$, where x, y and z are rational numbers between 0 (excluded) and 1 (excluded). In this configuration, x is preferably a rational number between 0 (excluded) and 0.6.

In a configuration, semi-conductive nanoparticles are II-VI type and comprise a core based on zinc, cadmium, sulfur and selenium and are selected from:

Cd$_w$Zn$_{(1-w)}$Se/CdS, Cd$_w$Zn$_{(1-w)}$Se/CdS/ZnS, Cd$_w$Zn$_{(1-w)}$Se/ZnSe/ZnS, Cd$_w$Zn$_{(1-w)}$Se/CdS/ZnSe, Cd$_w$Zn$_{(1-w)}$Se/CdS/ZnSe$_y$S$_{(1-y)}$,

Cd$_w$Zn$_{(1-w)}$Se$_x$S$_{(1-x)}$/ZnS, Cd$_w$Zn$_{(1-w)}$Se$_x$S$_{(1-x)}$/ZnSe, Cd$_w$Zn$_{(1-w)}$Se$_x$S$_{(1-x)}$/ZnSe$_y$S$_{(1-y)}$, Cd$_w$Zn$_{(1-w)}$Se$_x$Te$_{(1-x)}$/ZnS, Cd$_w$Zn$_{(1-w)}$Se$_x$Te$_{(1-x)}$/ZnSe,

Cd$_w$Zn$_{(1-w)}$Se/Cd$_y$Zn$_{(1-y)}$S, Cd$_w$Zn$_{(1-w)}$Se/Cd$_y$Zn$_{(1-y)}$S/ZnS, Cd$_w$Zn$_{(1-w)}$Se/Cd$_y$Zn$_{(1-y)}$S/ZnSe, Cd$_w$Zn$_{(1-w)}$Se/Cd$_y$Zn$_{(1-y)}$S/ZnSe$_z$S$_{(1-z)}$

Cd$_w$Zn$_{(1-w)}$Se/Cd$_y$Zn$_{(1-y)}$Se, Cd$_w$Zn$_{(1-w)}$Se/Cd$_y$Zn$_{(1-y)}$Se/ZnS, Cd$_w$Zn$_{(1-w)}$Se/Cd$_y$Zn$_{(1-y)}$Se/ZnSe, Cd$_w$Zn$_{(1-w)}$Se/Cd$_y$Zn$_{(1-y)}$Se/ZnSe$_z$S$_{(1-z)}$,

Cd$_w$Zn$_{(1-w)}$Se$_x$S$_{(1-x)}$/CdS, Cd$_w$Zn$_{(1-w)}$Se$_x$S$_{(1-x)}$/CdS/ZnS, Cd$_w$Zn$_{(1-w)}$Se$_x$S$_{(1-x)}$/CdS/ZnSe, Cd$_w$Zn$_{(1-w)}$Se$_x$S$_{(1-x)}$/CdS/ZnSe$_y$S$_{(1-y)}$,

Cd$_w$Zn$_{(1-w)}$Se$_x$S$_{(1-x)}$/Cd$_y$Zn$_{(1-y)}$S, Cd$_w$Zn$_{(1-w)}$Se$_x$S$_{(1-x)}$/Cd$_y$Zn$_{(1-y)}$S/ZnS, Cd$_w$Zn$_{(1-w)}$Se$_x$S$_{(1-x)}$/Cd$_y$Zn$_{(1-y)}$S/ZnSe, Cd$_w$Zn$_{(1-w)}$Se$_x$S$_{(1-x)}$/Cd$_y$Zn$_{(1-y)}$S/ZnSe$_z$S$_{(1-z)}$,

Cd$_w$Zn$_{(1-w)}$Se$_x$S$_{(1-x)}$/Cd$_y$Zn$_{(1-y)}$Se, Cd$_w$Zn$_{(1-w)}$Se$_x$S$_{(1-x)}$/Cd$_y$Zn$_{(1-y)}$Se/ZnS, Cd$_w$Zn$_{(1-w)}$Se$_x$S$_{(1-x)}$/Cd$_y$Zn$_{(1-y)}$Se/ZnSe, Cd$_w$Zn$_{(1-w)}$Se$_x$S$_{(1-x)}$/Cd$_y$Zn$_{(1-y)}$Se/ZnSe$_z$S$_{(1-z)}$, where w, x, y and z are rational numbers between 0 (excluded) and 1 (excluded).

Most preferred II-VI nanoparticles are CdSe/CdS/ZnS, CdSe$_x$S$_{(1-x)}$/CdS/ZnS, CdSe/ZnSe/ZnS, CdSe/ZnSe$_x$S$_{(1-x)}$/ZnS, CdSe$_x$S$_{(1-x)}$/ZnSe/ZnS, Cd$_y$Zn$_{(1-x)}$Se/ZnSe/ZnS, ZnSe$_x$S$_{(1-x)}$/ZnS, ZnSe$_x$S$_{(1-x)}$/ZnSe, ZnSe$_x$S$_{(1-x)}$/ZnSe$_y$S$_{(1-y)}$.

Other particularly suitable nanoparticles are III-V type semi-conductive nanoparticles and are selected from InP/ZnS, InP/ZnSe, InP/ZnSe$_x$S$_{(1-x)}$, InP/CdS/ZnS, InP/ZnSe/ZnS, InP/ZnSe$_x$S$_{(1-x)}$/ZnS, InP/GaP, Cu$_x$In$_y$Zn$_{(1-x-y)}$S/ZnS, In$_x$As$_{(1-x)}$P/ZnSe$_x$S$_{(1-x)}$, where x and y are rational numbers between 0 (excluded) and 1 (excluded).

Other particularly suitable nanoparticles are I-III-VI$_2$ type semi-conductive nanoparticles and are selected from AgInS$_2$, AgInSe$_2$, Cu$_x$In$_{(1-x)}$S$_2$, Cu$_x$In$_{(1-x)}$Se$_2$, Cu$_x$Al$_{(1-x)}$S$_2$, Cu$_x$Al$_{(1-x)}$Se$_2$, especially CuInS$_2$, CuInSe$_2$, CuAlS$_2$ and CuAlSe$_2$, where x is a rational number between 0 (excluded) and 2 (excluded). These semi-conductive nanoparticles may be the core of the following core/shell heterostructures: AgInS$_2$/ZnSe, AgInSe$_2$/ZnSe, CuInS$_2$/ZnSe, CuInSe$_2$/ZnSe, CuAlS$_2$/ZnSe, CuAlSe$_2$/ZnSe, Cu$_x$In$_{(2-x)}$S$_2$/ZnSe, Cu$_x$In$_{(2-x)}$ Se$_2$/ZnSe, CuxAl$_{(2-x)}$S$_2$/ZnSe, Cu$_x$Al$_{(2-x)}$Se$_2$/ZnSe, AgInS$_2$/ZnS, AgInSe$_2$/ZnS, CuInS$_2$/ZnS, CuInSe$_2$/ZnS, CuAlS$_2$/ZnS, CuAlSe$_2$/ZnS, Cu$_x$In$_{(2-x)}$S$_2$/ZnS, Cu$_x$In$_{(2-x)}$Se$_2$/ZnS, Cu$_x$Al$_{(2-x)}$S$_2$/ZnS, Cu$_x$Al$_{(2-x)}$Se$_2$/ZnS, where x is a rational number between 0 (excluded) and 2 (excluded).

Other particularly suitable nanoparticles are selected from doped quantum dots as core, such as ZnSe:Mn/ZnS, or ZnSe:Cu/ZnS.

Other particularly suitable nanoplates are selected from ZnTe/ZnSe$_y$S$_{(1-y)}$, ZnSe$_x$Te$_{(1-x)}$/ZnS, ZnSe$_x$Te$_{(1-x)}$/ZnSe, ZnSe$_x$Te$_{(1-x)}$/ZnSe$_y$S$_{(1-y)}$, where x and y are rational numbers between 0 (excluded) and 1 (excluded).

In an advantageous embodiment, semi-conductive nanoparticles have a largest dimension below 100 nm, in particular below 50 nm, ideally below 20 nm. Semi-conductive nanoparticles of small size do not induce light scattering when dispersed in a material having a different refractive index.

In an embodiment, the amount of semi-conductive nanoparticles in the filtering film is in a range from 0.05 wt % to 15 wt %, based on the weight of the filtering film, for a 10 μm-thick film, preferably from 0.1 wt % to 12 wt %, more preferably from 0.5 wt % to 10 wt %.

Semi-conductive nanoparticles of II-VI type and comprising a core based on zinc, sulfur and selenium are especially suitable as compounds absorbing UV-light when used with a concentration from 0.05 wt % to 8 wt %, preferably from 0.1 wt % to 6 wt %, more preferably from 0.5 wt % to 5 wt %.

In an embodiment, the semi-conductive nanoparticles are capped with an organic layer, an inorganic layer or a mixture thereof.

Composite Particles

In an embodiment, the semi-conductive nanoparticles are encapsulated in an encapsulating material, leading to composite particles. By encapsulating material, it is meant a material that covers all surface of semi-conductive nanoparticles. In other words, encapsulating material forms a barrier around the semi-conductive nanoparticles. Such a barrier as several advantages. In particular, said semi-conductive nanoparticles may be protected against chemicals, e.g., moisture, oxidants. Besides, semi-conductive nanoparticles that are not dispersible in a medium may be encapsulated in a material whose compatibility with said medium is good: the barrier behaves as a compatibilization agent. In addition, encapsulated semi-conductive nanoparticles may be under the form of a powder dispersible in a medium instead of a dispersion in a solvent, thereby providing with easier handling. Last, the encapsulating material may have a role of refractive index matching, in order to lower diffusion or haze: indeed, when semi-conductive nanoparticles are dispersed in a matrix, haze is proportional to the difference of refractive index between the matrix and the dispersed nanoparticles. Adding an encapsulating material with an intermediate refractive index mitigates this effect and lowers haze.

The encapsulating material may be an organic material or an inorganic material. For instance, the organic material may be selected from allyl polymers, (meth)acrylic polymers; epoxy compounds; polyurethane, polyester, polythiourethane materials, or mixture thereof. For instance, the inorganic material may be selected from sol gel materials, metal oxide materials, mineral oxides, or mixture thereof.

Suitable inorganic material may be selected from the group consisting of SiO$_2$, Al$_2$O$_3$, TiO$_2$, ZrO$_2$, HfO$_2$, GeO$_2$, SnO$_2$, or a mixture thereof, including for instance Al$_y$Zr$_z$O with $$\frac{3}{2}y + 2z = 1.$$

In an embodiment, the encapsulating material does not consist of pure SiO$_2$. By "pure", it is here meant that the encapsulating inorganic material is obtained by a synthesis intended to produce silica only. Impurities may be present in reactants as it is well know in the inorganic synthesis domain and still the synthesis may lead to pure silica.

In an embodiment, the encapsulating material does not absorb UV-light, and absorbance of the filtering film is only defined by semi-conductive nanoparticles. Alternatively, the encapsulating material does absorb UV-light, and absorbance of the filtering film is defined by the sum of absorbance of semi-conductive nanoparticles and absorbance of encapsulating material.

In an embodiment, the loading charge of the semi-conductive nanoparticles in the composite particle is at least 1%, preferably at least 2.5%, more preferably at least 5%, said loading charge being the mass ratio between the mass of semi-conductive nanoparticles comprised in a composite particle and the mass of said composite particle. Indeed, the performance of composite particles is proportional to the concentration of semi-conductive nanoparticles they contain. Therefore, a high concentration of semi-conductive nanoparticles is advantageous. It has to be noted however that increasing concentration of semi-conductive nanoparticles without degrading their properties—as a consequence of aggregation or manufacturing process for instance—is not easy.

The composite particles may be in the form of a monodisperse population. Monodisperse composite particles are advantageous for various reasons, depending on the domain of application. When composite particles are used in filtering films, a homogeneous size distribution avoids uncontrolled light diffusion and ensures spatial homogeneity of the filtering film.

In an embodiment, composite particles have a largest dimension below 500 nm, in particular below 300 nm, ideally below 200 nm.

The mean size of the composite particles is preferably in a range from 50 nm to 500 nm, more preferably from 50 nm to 250 nm. Composite particles having a mean size from 50 nm to 250 nm, preferably from 50 nm to 100 nm are especially suitable to obtain filtering films with high transparency and low haze.

The composite particles may be chemically modified on their surface. Chemical modification may be obtained by grafting, by adsorption of molecules or by physical processes—heat, vacuum or gaseous treatment. Chemical modification may use compatibilization agents, allowing to mix composite particles in complex formulations—such as resins, varnishes, paints, colloidal dispersion, polymerizable compositions . . . —without aggregation or phase separation of the composite particles.

Organic Compounds Absorbing UV-Light

As an alternative to semi-conductive nanoparticles, compounds absorbing UV-light may be organic anti-UV compounds.

Especially suitable organic anti-UV compounds may be selected in the group consisting of benzotriazoles, triazines, piperidines, benzophenones, catechol, their derivatives, and mixtures thereof.

Suitable benzotriazoles are derivatives of (2H-benzotriazol-2-yl)-4-hydroxybenzene such as Sodium 3-(2H-benzotriazol-2-yl)-5-sec-butyl-4-hydroxybenzenesulfonate—CAS number 92484-48-5—or Polyethylene glycol mono-3-(3-(2H-benzotriazol-2-yl)-5-tert-butyl-4-hydroxyphenyl)-1-oxopropyl ether—CAS number 104810-48-2—or Polyethylene glycol di[3-[3-(2H-benzotriazol-2-yl)-5-tert-butyl-4-hydroxyphenyl]-1-oxopropyl] ether—CAS number 104810-47-1—or Benzenepropanoic acid, 3-(2H-benzotriazol-2-yl)-5-(1,1-dimethylethyl)-4-hydroxy-, C7-9-branched and linear alkyl esters—CAS number 127519-17-9—or 2-(2H-Benzotriazol-2-yl)-6-(1-methyl-1-phenylethyl)-4-(1,1,3,3-tetramethylbutyl) phenol—CAS number 73936-91-1.

Suitable triazines are reaction products of 1,3-Benzenediol, 4-[4,6-bis(2,4-dimethylphenyl)-1,3,5-triazin-2-yl] with [(dodecyloxy)methyl]oxirane and oxirane mono[(C10-16-alkyloxy)methyl] derivatives—CAS number 153519-44-9—or Isooctyl 2-[4-[4,6-bis[(1,1'-biphenyl)-4-yl]-1,3,5-triazin-2-yl]-3-hydroxyphenoxy]propanoate—CAS number 204848-45-3—or triazine know as TINUVIN®477 supplied by BASF.

A suitable piperidines is bis(1-octyloxy-2,2,6,6-tetramethyl-4-piperidyl) sebacate—CAS number 129757-67-1.

A mixture of bis(1-octyloxy-2,2,6,6-tetramethyl-4-piperidyl) sebacate—CAS number 129757-67-1—and reaction products of 1,3-Benzenediol, 4-[4,6-bis(2,4-dimethylphenyl)-1,3,5-triazin-2-yl] with [(dodecyloxy)methyl] oxirane and oxirane mono[(C10-16-alkyloxy)methyl] derivatives—CAS number 153519-44-9—known under tradename Eversorb AQ8 is especially suitable.

Other suitable organic anti-UV compounds are avobenzones, such as 1,3-Propanedione, 1-[4-(1,1-dimethylethyl) phenyl]-3-(4-methoxyphenyl)—CAS number 70356-09-1—or the compound known under tradename Parsol guard.

Among these organic anti-UV compounds, those having an absorption peak—either principal or secondary—in the range from 300 nm to 340 nm are preferred. In particular, Tinuvin 384-2, Eversorb AQ8 and Tinogard HS are suitable.

The following mixture of organic anti-UV compounds is also suitable: Tinuvin 384-2; Parsol Guard and Eversorb AQ8 in 1:1:1 proportion.

In an embodiment, the amount of organic anti-UV compounds in the filtering film is in a range from 2 wt % to 25 wt %, based on the weight of the filtering film, for a 10 μm-thick film, preferably from 2 wt % to 15 wt %, more preferably from 2.5 wt % to 12 wt %, even more preferably from 3 wt % to 10 wt %.

In an embodiment, compounds absorbing UV-light comprise a mixture of one or more semi-conductive nanoparticles and/or one or more organic anti-UV compounds. In this embodiment, the amount of compounds absorbing UV-light in the filtering film is in a range from 3 wt % to 15 wt %, based on the weight of the filtering film, for a 10 μm-thick film.

In an embodiment, the compounds absorbing UV-light do not comprise more than 2.5 wt %, based on the weight of the filtering film, for a 10 μm-thick film, of core-shell semi-conductive nanoparticles comprising:

a core of ZnSe$_x$S$_{(1-x)}$ material where x is in a range from 0.60 to 0.98, and
a shell of ZnS material,
and having a local maximum absorbance of highest wavelength in the range from 350 to 500 nm.
More preferably, the compounds absorbing UV-light do not comprise core-shell semi-conductive nanoparticles comprising:

a core of ZnSe$_x$S$_{(1-x)}$ material where x is in a range from 0.60 to 0.98, and
a shell of ZnS material,
and having a local maximum absorbance of highest wavelength in the range from 350 to 500 nm.

Binder

In the disclosure, the filtering film comprises a binder. This binder may be of various polymer types, for instance selected among poly(methyl methacrylate) (PMMA), poly (butyl methacrylate), poly(lauryl methacrylate), poly(vinyl butyral), poly(vinyl acetate), poly(ethylene vinyl acetate), thermoplastic polyurethane, cellulose, ionoplast, polycarbonate, poly(ethylene vinyl alcool), polyester/melamine adducts, silicone, polyphenylmethylsiloxane, polyphenylalkylsiloxane, polydiphenylsiloxane, polydialkylsiloxane, fluorinated silicone, vinyl and hydride substituted silicone, divinylbenzene, or a mixture thereof.

The filtering film may be obtained from a thermoplastic polymer, in which compounds absorbing UV-light are dispersed, typically during melting/extrusion/stretching process. The thickness of the filtering film is here controlled by the fabrication process.

Alternatively, the filtering film may be obtained from a polymerizable composition, in which compounds absorbing UV-light are dispersed. Then, the polymerizable composition is cured—thermally, actinically (including by UV radiation) or by any other curing mean—or dried to yield a film. In this case, the polymerizable composition may comprise a solvent.

In an embodiment, the film is obtained by curing a Sol-Gel polymerizable composition and has a thickness in a range from 1 μm to 15 μm, preferably from 1 μm to 10 μm, more preferably from 2 μm to 6 μm.

In one embodiment, the film is obtained by curing a composition comprising (meth)acrylics monomers or oligomers, epoxy monomers or oligomers, or mixture thereof. In particular, the thickness of coating obtained by curing said polymerizable composition is in a range from 2 μm to 100 μm, preferably from 3 μm to 50 μm, more preferably from 4 μm to 30 μm.

Colour of the Cosmetic Bottle

In this disclosure, the cosmetic bottle comprises a container on which a filtering film is coated. It is of prime importance that the aesthetic appearance of the container be not altered by the filtering film, in particular in terms of perceived colour and lightness.

Indeed, the container may be a "white" container, i.e. a container having almost no colour and transparent. In terms of colorimetry, such a container has high lightness and a low chroma. Alternatively, the container may be coloured but still transparent, with a high lightness and a faint or vivid colour—as described by chroma and hue.

In addition, the filtering film should not be hazy. Indeed, the clear appearance of the container must also be unaltered.

The colour of the container is determined by well-known colorimetric measurements. A part of the container is illuminated with a standard illuminant and light transmitted through the container is analyzed according to CIE L*a*b* model (standard observer 2°), yielding Lightness L*u, Chroma C*u and hue h*u (u stand for uncoated container). Representation of colour with chroma and hue is especially appropriate for white containers, as colour of white containers approaches a zero chroma, and hue is less relevant in this case.

In addition, measure of luminous transmittance-noted Tv hereafter-through the container gives an indication of Lightness. Indeed, a container with a low chroma will appear grey if Tv is low and bright/clear if Tv is high.

After coating with the filtering film, the cosmetic container becomes a cosmetic bottle, whose colorimetric properties can be assessed again: Lightness L*c, Chroma C*c and hue h*c (c stand for coated container).

In an embodiment, the difference of lightness between the cosmetic bottle and the container is lower than 5. In particular, the difference of lightness may be lower than 4, preferably lower than 3, more preferably lower than 2.

In an embodiment, the Chroma C*c of the cosmetic bottle is lower than 60, preferably lower than 50. Even if this chroma may appear large, colour balancing additives may be added to the filtering film to lower chroma but with a lowering of lightness.

In a particular embodiment, the difference of lightness between the cosmetic bottle and the container is lower than 2 and the Chroma C*c of the cosmetic bottle is lower than 60.

In an embodiment, the luminous transmission of the cosmetic bottle is greater than 90%, preferably greater than 95%, of the luminous transmission of the container. In these conditions, the lightness of the container is not degraded by the filtering film.

If the cosmetic bottle is not evenly coloured, being decorated with a pattern or an image for instance, then the colour assessment is made on a part of the cosmetic bottle where colorimetric parameters are well defined.

BRIEF DESCRIPTION OF THE DRAWINGS

FIG. 1A-1F illustrates various nanoparticles with homo-structure (A) or heterostructures: spherical core/shell (B), spherical core/shell/shell (C), dot in plate (D), nanoplate core/shell (E) and nanoplate core/crown (F).

FIG. 7 is an extract of the Gas Phase Chromatography (GPC) curve for composition B.

EXAMPLES

Figures 1, 2:
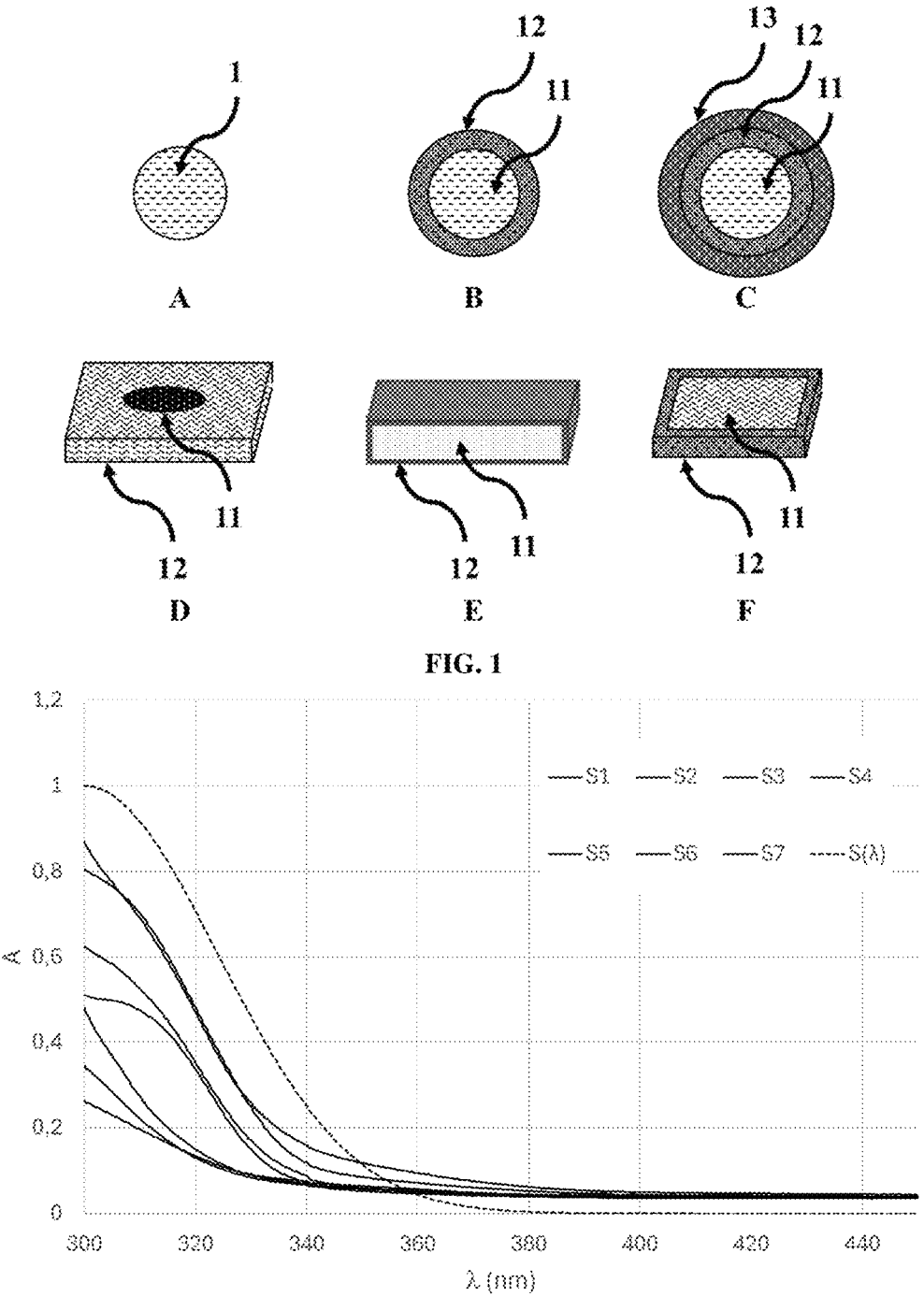
FIG. 2 shows absorbance curves as a function of wavelength of 7 different odorant molecules often used in fragrances (noted S1 to S7) devoid of photo-stabilizers. The curve of the sensitivity function S(λ) is shown in dotted line.

The present invention is further illustrated by the following examples.

5 perfumes have been prepared, noted A to E. Each fragrancing composition is a mixture of 20 wt % of perfume extract, 5 wt % water and 75 wt % ethanol. Last, a commercial perfume, noted F, has been used.

Protection of Perfumes—Sensory Assessment:

Composition A is a natural and synthetic perfume belonging to the floral citrus olfactory family. It is characterized by fresh and citrusy top notes, accompanied by light floral facets with a yellow to dark yellow color of the perfume. Composition A comprises around 1000 ppm of cinnamaldehyde and 700 ppm of α-phellandrene, among other aroma compounds.

Composition B is a 100% synthetic perfume it is classified in the woody fruity olfactory family, with an achromaticity of the perfume. Composition B comprises around 2000 ppm of α-isomethylionone and 100 ppm of α-damascone, among other aroma compounds.

Composition C is a synthetic and natural perfume that is part of the floral powdery olfactory family. Its delicate floral notes evolve towards drier and powdery aspects with a yellowish color of the perfume. Composition C comprises around 10000 ppm of α-isomethylionone, among other aroma compounds.

Composition D is a synthetic perfume that belongs to the floral fruity olfactory family with an achromaticity of the perfume. Composition D comprises around 5000 ppm of β-ionone, among other aroma compounds.

Composition E is 100% synthetic perfume that is classified in the amber woody olfactory family with a yellowish color of the perfume. Composition E comprises around 4000 ppm of α-isomethylionone, among other aroma compounds.

Composition F is a floral musky olfactory family. It is a commercial perfume with a pinkish color. Composition F comprises around 10000 ppm of β-ionone, among other aroma compounds.

For compositions A-E, three samples are prepared. Sample noted O is the pure composition filled in a glass container without filtering film. Sample noted Chem is the composition in which three photo-stabilizers are added, namely 0.1 wt % of dibutylhydroxytoluene (BHT), 0.1 wt % of avobenzone (AVB) and 0.1 wt % of ethylhexylmetoxy-cinnamate (EHMC). Sample noted Film-n is the pure composition filled in a glass container with a filtering film whose composition "n" is detailed herafter.

For composition F, the sample Chem is the commercial product, including the commercial amounts of photo-stabilizers. But, the perfume concentrate, without photo-stabilizer has been used for Sample O and Sample Film-n in the same way as for compositions A-E.

Just after preparation, the samples are evaluated by an olfactory expert, a perfumer.

The three samples—O, Chem and Film-n—are then placed in a SUNTEST cabin under constant illumination corresponding to D65 illuminant-thus including UV light from 300 nm wavelength—with 550 W/m² total power at 40° C. temperature. After 4 hours, 12 hours and 24 hours, the three samples are measured by GPC and evaluated again by the same perfumer to rate the fidelity of the scent with the following marks: +++ marks a very high fidelity, ++ marks a high fidelity, + marks a fair fidelity and ½ marks a bad fidelity.

The following table II shows the evaluation by the perfumer:

TABLE II

| Composition | SUNTEST duration | Sample O | Sample Chem | Sample Film-2 |
|---|---|---|---|---|
| A | 4 hours | ++ (F) | +++ | +++ |
|  | 12 hours | + (F/A) | ++ (F) | +++ |
|  | 24 hours | + (F/A) | + (F/A) | ++ (F) |
| B | 4 hours | ++ (F+) | ++ (F) | +++ |
|  | 12 hours | + (F/A) | + (F/A) | ++ (F) |
|  | 24 hours | ½ (F/A) | ½ (F/A) | ½ (F/A−) |
| C | 4 hours | ++ (F/A−) | ++(F) | +++ |
|  | 12 hours | + (F/A) | + (F+) | +++ (F−) |
|  | 24 hours | + (F/A) | + (F+/A) | ++ (F) |
| D | 4 hours | ++ (F) | +++ | +++ (F−) |
|  | 12 hours | + (F/A) | ++ (F) | ++ (F) |
|  | 24 hours | + (F+/A) | ++ (F/A−) | ++ (F/A−) |
| E | 4 hours | ++ (F−) | +++ | +++ (F−) |
|  | 12 hours | + (F/A−) | ++ (F) | ++ (F) |
|  | 24 hours | ½ (F/A) | + (F/A) | ½ (F) |
| F | 4 hours | ++ (F/A−) | +++ (F−) | +++ (F−) |
|  | 12 hours | + (F/A) | ++ (F) | ++ (F−) |
|  | 24 hours | ½ (F+) | + (F/A−) | ++ (F−) |

F+: large freshness loss/F: freshness loss/F−: light fresh loss/A: alteration/A−: light alteration It appears that for each composition, the filtering film demonstrates better or equivalent results as the current addition of photo-stabilizers in perfumes. Besides, the degradation products of these photo-stabilizers are obviously retrieved in GPC. Indeed, almost 50% of the photo-stabilizers are degraded after 24 hours in SUNTEST. This phenomenon could explain why the scent of perfumes after 24 hours are best protected by the filtering film—which does not degrade with time—as compared to photo-stabilizers included in the perfume.

Protection of Perfumes—Analytical Assessment:

FIG. 7 shows an extract of the GPC curve for composition B after 24 hours. Curve 1 (black) is the GPC of the sample O before SUNTEST. Curve 2 (red) is the GPC of sample Chem after 24 hours SUNTEST. Curve 3 (blue) is the GPC of sample O after 24 hours SUNTEST. Curve 4 (green) is the GPC of sample Film-2 after 24 hours SUNTEST.

Figure 7A:
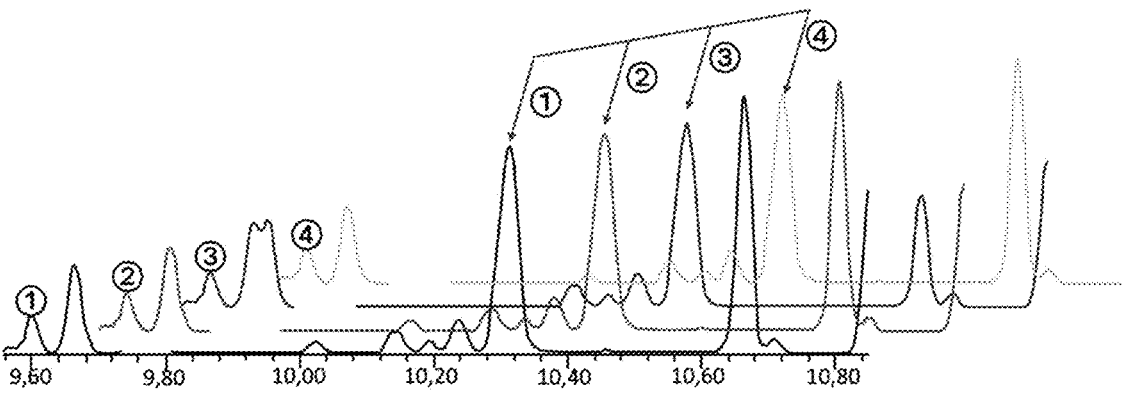
FIG. 7A highlights a compound not degraded by UV-light.

On FIG. 7A, four peaks are highlighted, and correspond to a compound which is not degraded—at least not significantly—because the peak of curve 3 is similar with the peak of curve 1.

Figure 7B:
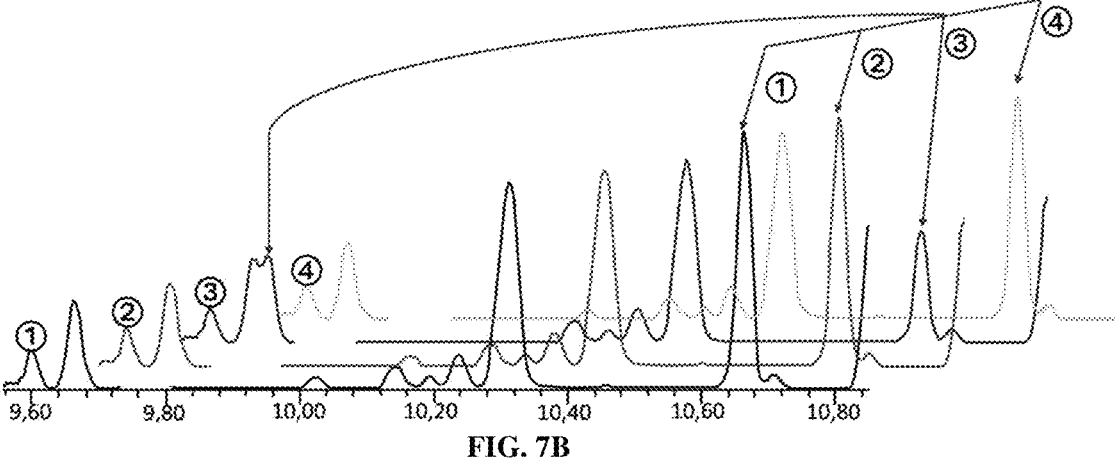
FIG. 7B highlights protection of α-isomethylionone.

On FIG. 7B, the focus is shed on α-isomethylionone. whose peak is centered around 10.65 min. One can see that α-isomethylionone is strongly degraded after 24 hours in SUNTEST, as the peak of curve 3 is much smaller than peak of curve 1. In addition, a degradation product is identified on the same curve 3, around 9.70 min, as a "shoulder" appearing on another peak. Curves 2 and 4 show that protection by chemical additives or by filtering film are equivalent for α-isomethylionone.

Figure 7C:
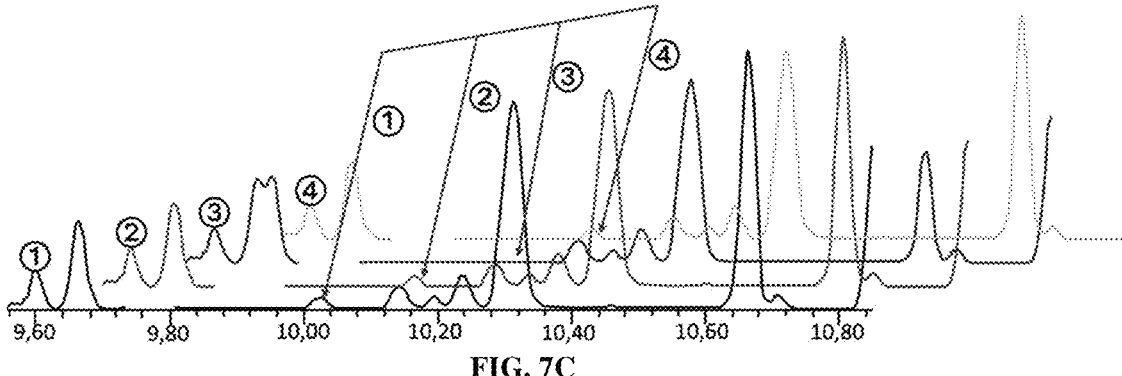
FIG. 7C highlights protection of α-damascone.

On FIG. 7C, the focus is shed on α-damascone. whose peak—much smaller, because concentration of α-damascone is low in composition B—is centered around 10.02 min. One can see that α-damascone is totally degraded after 24 hours in SUNTEST, as curve 3 does not present a peak anymore. Curves 2 and 4 show that protection by chemical additives or by filtering film are equivalent for α-damascone.

Figure 8:
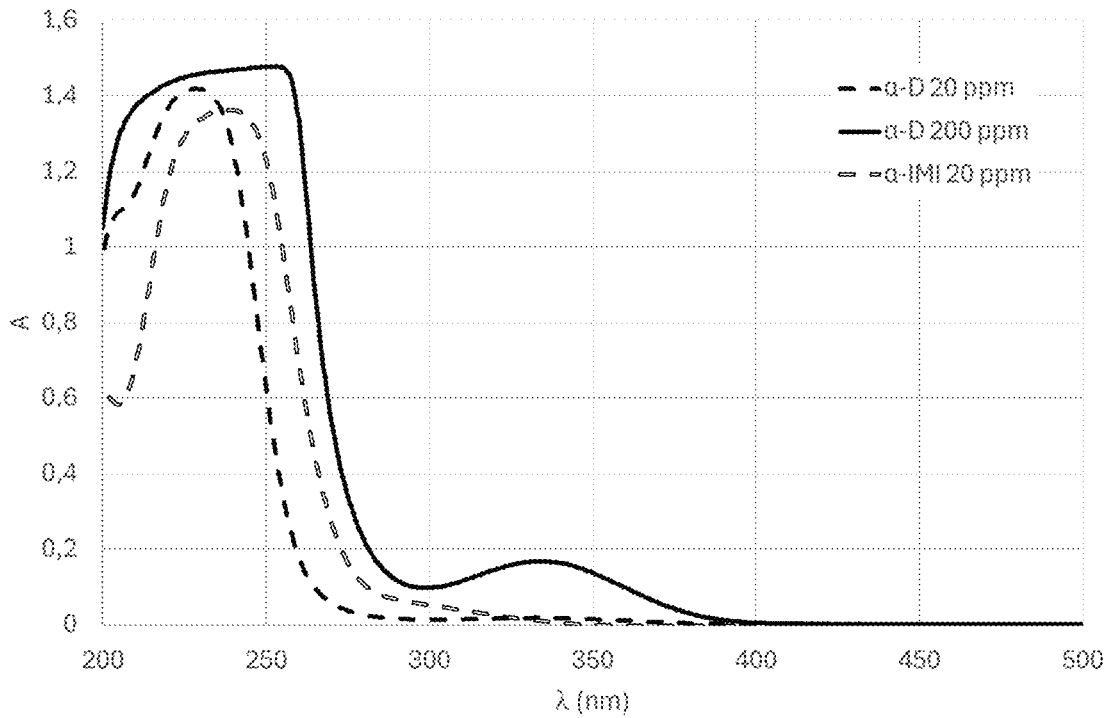
FIG. 8 shows the absorbance (A) of 20 ppm α-isomethylionone in ethanol (α-IMI 20), 20 ppm α-damascone in ethanol (α-D 20) and 200 ppm α-damascone in ethanol (α-D 200) as a function of wavelength of light λ (nm).

FIG. 8 shows the absorption spectra (Absorbance A) in UV light range for 20 ppm α-isomethylionone in ethanol (α-IMI 20), 20 ppm α-damascone in ethanol (α-D 20) and 200 ppm α-damascone in ethanol (α-D 200). The major peaks located around 230-250 nm-saturated absorbance for α-D 200—correspond to absorbance of non-conjugated carbon-carbon double bonds in both molecules. The signature of α,β-unsaturated carbonyl functional group in these spectra is located around 330 nm: a clear peak is observed for diluted α-D 20, less visible on diluted α-D 200. The absorption is less obvious for α-IMI 20, due to high dilution, but still visible below 330 nm. The technical effect of the disclosure is focused on the range of wavelength from 300 nm to 340 nm, as illustrated in FIG. 2, where the two aroma compounds of composition B are prone to absorb ambient UV light, leading to degradation.

GPC analyses have been run for the six compositions and show that the following compounds are degraded in Sample O, while they are protected in Sample Chem and Sample Film-2—differences between the latter being not quantitatively significant:

α-phellandrene, cinnamaldehyde and α-farnesene in composition A;

α-isomethylionone and α-damascone in composition B;

germacrene D, citral and α-isomethylionone in composition C;

α-isomethylionone in composition E;

β-ionone in compositions D and F.

All these molecules present an absorption of light in the range of wavelength from 300 nm to 340 nm leading to degradation, which is prevented thanks to the protection here disclosed.

It is thus shown that the filtering film used in this disclosure allows to remove totally the photo-stabilizers inside a fragrancing composition, while keeping a comparable protection.

Comparative Example

Commercial bottles for fragrance are used. The raw bottle allows measuring the absorption curve of the substrate alone. A second bottle is coated with a commercial composition recommended for coating of fragrance bottles, yielding a bottle with a filtering film of thickness 10 μm. A third bottle is coated with a filtering film according to the disclosure, namely Film-1. A fourth bottle is coated with a filtering film according to the disclosure, namely Film-3.

Figure 3:
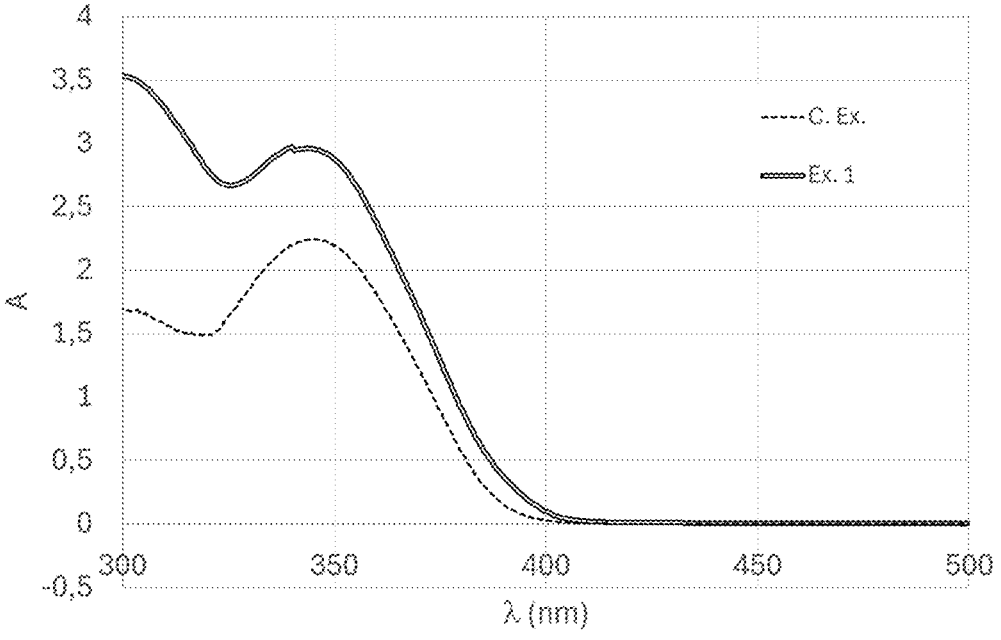
FIG. 3 shows absorbance curves as a function of wavelength A(λ) for a commercial coating (Comparative example in dotted line) and Ex. 1 (in double line).
Figure 4:
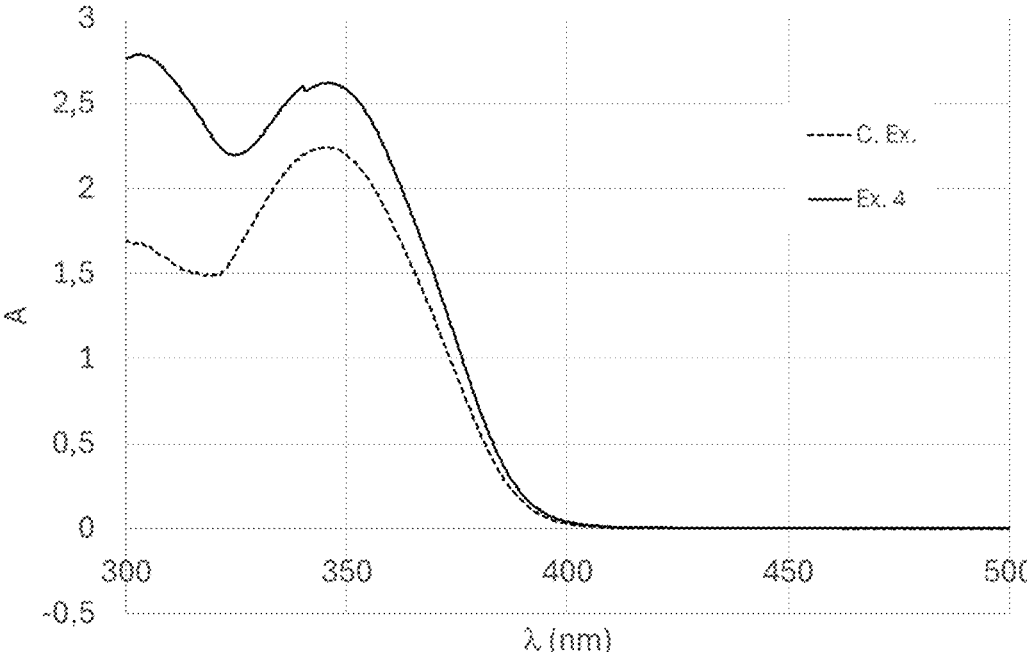
FIG. 4 shows absorption curves as a function of wavelength A(λ) for a commercial coating (Comparative example in dotted line) and Ex.4 (in continuous line).

The absorption of the commercial recommended filtering film is measured by difference of absorption between second bottle and first bottle. The absorption curve is shown in FIGS. 3 and 4—dotted line. The corresponding values for $A_{380}$ and $A_{340}$ are 1.8 and 1.8 respectively.

The absorption of filtering films Film-1 according to the disclosure is measured by difference of absorption between third bottle and first bottle and show on FIG. 3. The corresponding values for $A_{380}$ and $A_{340}$ are 2.8 and 2.8 respectively.

The absorption of filtering films Film-4 according to the disclosure is measured by difference of absorption between third bottle and first bottle and show on FIG. 4 The corresponding values for $A_{380}$ and $A_{340}$ are 2.4 and 2.4 respectively.

Then, all bottles are filled with a fragrancing composition devoid of photo-stabilizers and the bottles are placed under SUNTEST. During the SUNTEST, the UV-visible absorbance value at 500 nm of the fragrancing composition is measured and compared with the spectrum before SUNTEST. The comparison of spectra before and during SUNTEST allows to determine if the composition under study has been protected by the filtering film or not.

Figure 5:
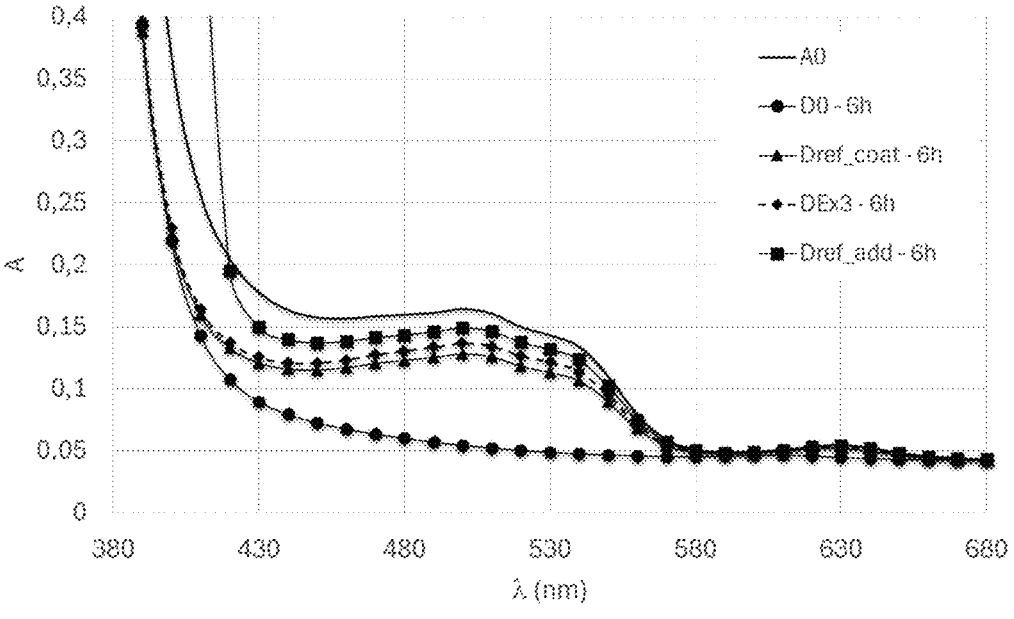
FIG. 5 shows the UV-visible spectrum of a fragrancing composition (absorbance A) as a function of wavelength (λ in nm) in different conditions. A0 represents the fragrancing composition before SUNTEST. DO-6 h represents the spectrum of the fragrancing composition devoid of any UV protection after 6 hours of SUNTEST. Dref_add-6 h represents the fragrancing composition comprising an additive—mainly avobenzone—after 6 hours of SUNTEST. Dref_coat-6 h represents the fragrancing composition protected by the reference coating of comparative example after 6 hours of SUNTEST. DEx3-6 h represents the fragrancing composition protected by the filtering film-3 after 6 hours of SUNTEST.

FIG. 5 shows the UV-visible spectrum A0 of the fragrancing composition before SUNTEST. DO-6 h represents the spectrum of the fragrancing composition devoid of any UV protection after 6 hours (raw bottle). Dref_add-6 h represents the fragrancing composition comprising an additive—mainly avobenzone—after 6 hours setting the standard protection of the industry (raw bottle). Note that the spectrum below 430 nm is slightly different due to the presence of the additive. Dref_coat-6 h represents the fragrancing composition protected by the reference coating of comparative example (second bottle): the protection is not appropriate. Finally, DEx3-6 h represents the fragrancing composition protected by the filtering film-3 (fourth bottle): protection is better than the reference coating and approaches the standard of industry.

Figure 6:
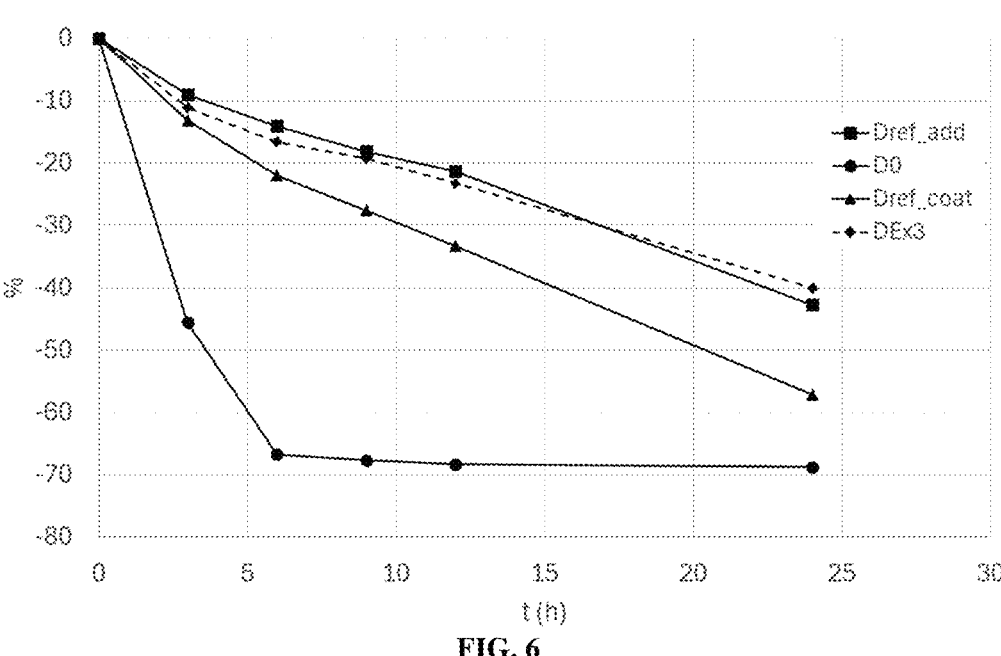
FIG. 6 shows the relative decrease (%) of absorbance at 500 nm of a fragrancing composition during time (t in hours) under SUNTEST conditions. DO represents the fragrancing composition devoid of UV protection: a strong and quick degradation is observed. Dref_add represents the fragrancing composition comprising an additive—mainly avobenzone—setting the standard protection of the industry. Dref_coat represents the fragrancing composition protected by the reference coating of comparative example. DEx3 represents the fragrancing composition protected by the filtering film-3.

FIG. 6 presents the relative decrease of absorbance at 500 nm for the fragrancing composition during a SUNTEST. DO represents the fragrancing composition devoid of UV protection: a strong and quick degradation is observed. Dref_add represents the fragrancing composition comprising an additive—mainly avobenzone—setting the standard protection of the industry. Dref_coat represents the fragrancing composition protected by the reference coating of comparative example: the protection is not appropriate. DEx3 represents the fragrancing composition protected by the filtering film of example 3: protection is similar to the standard of industry.

In SUNTEST, the commercial bottle is not satisfactory: changes in UV-visible absorption spectrum—see FIG. 5—and colour—see FIG. 6—of the fragrancing composition are observed.

Film-1 to Film-7:

Various filtering films have been prepared. They show good protection for the six compositions.

5 wt % of organic absorber Tinuvin 384-2 and 5 wt % of core shell semi-conductive nanoparticles SC #1 are added in a waterborne polyester resin (75 parts)—hexamethoxymethyl melamine (25 parts) polymerizable composition—hereafter Ref binder—then cured. After cure, the filtering film is 10 µm thick. The core of the semi-conductive nanoparticles has a diameter of 3.0 nm and formula $ZnSe_xS_{(1-x)}$ with x about 0.94 and a shell of ZnS of mean thickness 1.3 nm. $\lambda_{max}$ for SC #1 is about 400 nm.

The absorption curve is shown in FIG. 3. The corresponding values for $A_{380}$ and $A_{340}$ are 2.8 and 2.8 respectively.

Film-1 is reproduced, but composition of compounds absorbing UV-light is changed according to the following table (in weight %, based on the weight of the filtering film). These filtering films protect accurately the six compositions during SUNTEST.

TABLE III

| Ex | Semi-conductive nanoparticles | wt % | Organic anti-UV compounds | wt % | $A_{380}$ | $A_{340}$ |
|---|---|---|---|---|---|---|
| 1 | SC#1 | 5 | Tinuvin 384-2 | 5 | 2.8 | 2.8 |
| 2 | SC#1 | 0.05 | Tinuvin 384-2 | 4 | 2.1 | 2.0 |
| 3 | SC#1 | 1.1 | Tinuvin 384-2 | 7.5 | 3.6 | 3.7 |
| 4 | — | — | Tinuvin 384-2 | 5 | 2.4 | 2.4 |
| 5 | SC#1 | 4.6 | Tinogard HS | 1.3 | 3 | 3.2 |
| 6 | SC#1 | 1.1 | Tinuvin 384-2 | 5 | | |
| | | | Tinuvin 249 | 1.3 | | |
| 7 | SC#1 | 1.1 | Tinuvin 384-2 | 10 | | |
| | | | Tinuvin 249 | 2.6 | | |

Film-10 to Film-133:

Further examples are reproduced, but composition of compounds absorbing UV-light is changed according to the following table III (in weight %, based on the weight of the filtering film). Film thickness is also changed to be either 10 µm, 12 µm or 15 µm. All these films show values for $A_{380}$ greater than 2 and protect accurately the six compositions during SUNTEST.

Solvent-borne compositions are based on Ref binder of example 1. Water-borne compositions are based on saturated polyesters with a dry extract of 30% in water and less than 10% of polar co-solvents.

TABLE IV

| Example | Resin | Ecotox | Thickness (µm) | $A_{380}$ | SC#1 | T384-2 | T479 | T477 | E109 | T400 | E-BL1B | T234 | T928 | T1130 | T − M | T − S | A + O |
|---|---|---|---|---|---|---|---|---|---|---|---|---|---|---|---|---|---|
| 10 | Ref binder | — | 15 | 5.06 | 0.10% | 10.2% | | | | | | | | | | | |
| 11 | Ref binder | comply | 15 | 3.96 | 0.10% | 2.8% | 2.8% | | 2.8% | | | | | | | | |
| 12 | Ref binder | comply | 15 | 4.34 | 0.10% | 2.8% | | | 2.8% | 4.1% | | | | | | | |
| 13 | Ref binder | comply | 15 | 3.82 | 0.10% | 2.8% | 4.1% | | 2.2% | | | | | | | | |
| 14 | Ref binder | comply | 15 | 4.13 | 0.10% | 2.8% | | | 2.0% | 4.1% | | | | | | | |
| 15 | Ref binder | — | 15 | 4.15 | 0.10% | 3.6% | | | 1.7% | 5.4% | | | | | | | |
| 16 | Ref binder | — | 15 | 4.45 | 0.10% | 3.6% | | 0.8% | 0.8% | 5.4% | | | | | | | |
| 17 | Ref binder | comply | 15 | 4.24 | 0.10% | 2.8% | | | 2.0% | 5.4% | | | | | | | |
| 18 | Ref binder | — | 15 | 4.68 | 0.10% | 3.8% | | | 2.0% | 4.6% | | | | | | | |
| 19 | Ref binder | — | 15 | 4.35 | 0.10% | 3.8% | 0.8% | | 2.0% | 4.6% | | | | | | | |
| 20 | Ref binder | — | 15 | 4.32 | 0.10% | 6.7% | | | 1.4% | 2.2% | | | | | | | |

TABLE IV-continued

| Example | Resin | Ecotox | Thickness (µm) | $A_{380}$ | SC#1 | T384-2 | T479 | T477 | E109 | T400 | E-BL1B | T234 | T928 | T1130 | T–M | T–S | A+O |
|---|---|---|---|---|---|---|---|---|---|---|---|---|---|---|---|---|---|
| 21 | Ref binder | — | 15 | 4.50 | 0.10% | 6.7% | | | 0.6% | 0.8% | | | | | | | |
| 22 | Ref binder | — | 15 | 4.47 | 0.10% | 4.1% | | | 2.0% | 4.1% | | | | | | | |
| 23 | Ref binder | — | 15 | 4.39 | 0.10% | 5.4% | | | 1.4% | 2.2% | | | | | | | |
| 24 | Ref binder | — | 15 | 3.86 | 0.10% | 4.1% | 2.2% | | 2.2% | | | | | | | | |
| 25 | Ref binder | — | 15 | 4.75 | 0.10% | 5.4% | 2.0% | | 1.7% | | | | | | | | |
| 26 | Ref binder | — | 15 | 4.23 | 0.10% | 5.4% | 2.0% | | 2.0% | | | | | | | | |
| 27 | Ref binder | — | 15 | 5.44 | 0.10% | 4.1% | 2.8% | | 2.8% | | | | | | | | |
| 28 | Ref binder | — | 15 | 4.53 | 0.10% | 4.4% | 2.0% | | 2.8% | 2.8% | | | | | | | |
| 29 | Ref binder | — | 15 | 3.93 | 0.10% | 4.1% | | | 2.8% | 5.4% | | | | | | | |
| 30 | Ref binder | — | 15 | 4.93 | 0.10% | 5.4% | | | 2.2% | 4.1% | | | | | | | |
| 31 | Ref binder | — | 15 | 4.96 | | 10.3% | | | | | | | | | | | |
| 32 | Ref binder | comply | 15 | 3.88 | | 2.8% | 2.8% | | 2.8% | | | | | | | | |
| 33 | Ref binder | comply | 15 | 4.25 | | 2.8% | | | 2.8% | 4.1% | | | | | | | |
| 34 | Ref binder | comply | 15 | 3.75 | | 2.8% | 4.1% | | 2.2% | | | | | | | | |
| 35 | Ref binder | comply | 15 | 4.05 | | 2.8% | | | 2.0% | 4.1% | | | | | | | |
| 36 | Ref binder | — | 15 | 4.07 | | 3.6% | | | 1.7% | 5.4% | | | | | | | |
| 37 | Ref binder | — | 15 | 4.36 | | 3.6% | | 0.8% | 0.8% | 5.4% | | | | | | | |
| 38 | Ref binder | comply | 15 | 4.16 | | 2.8% | | | 2.0% | 5.4% | | | | | | | |
| 39 | Ref binder | — | 15 | 4.58 | | 3.8% | | | 2.0% | 4.6% | | | | | | | |
| 40 | Ref binder | — | 15 | 4.26 | | 3.8% | 0.8% | | 2.0% | 4.6% | | | | | | | |
| 41 | Ref binder | — | 15 | 4.23 | | 6.7% | | | 1.4% | 2.2% | | | | | | | |
| 42 | Ref binder | — | 15 | 4.41 | | 6.7% | | | 0.6% | 0.8% | | | | | | | |
| 43 | Ref binder | — | 15 | 4.38 | 1% | 4.1% | | | 2.0% | 4.1% | | | | | | | |
| 44 | Ref binder | — | 15 | 4.30 | 1% | 5.4% | | | 1.4% | 2.2% | | | | | | | |
| 45 | Ref binder | — | 15 | 3.79 | 1% | 4.1% | 2.2% | | 2.2% | | | | | | | | |
| 46 | Ref binder | — | 15 | 4.66 | 1% | 5.4% | 2.0% | | 1.7% | | | | | | | | |
| 47 | Ref binder | — | 15 | 4.14 | 1% | 5.4% | 2.0% | | 2.0% | | | | | | | | |
| 48 | Ref binder | — | 15 | 5.33 | 1% | 4.1% | 2.8% | | 2.8% | | | | | | | | |
| 49 | Ref binder | — | 15 | 4.44 | 1% | 4.4% | 2.0% | | 2.8% | 2.8% | | | | | | | |
| 50 | Ref binder | — | 15 | 3.85 | 5% | 4.1% | | | 2.8% | 5.4% | | | | | | | |
| 51 | Ref binder | — | 15 | 4.83 | 5% | 5.4% | | | 2.2% | 4.1% | | | | | | | |
| 52 | Ref binder | — | 15 | 5.21 | 5% | 10.2% | | | | | | | | | | | |
| 53 | Ref binder | comply | 15 | 7.08 | 5% | 2.7% | 2.7% | 2.7% | | | | | | | | | |
| 54 | Ref binder | comply | 15 | 4.47 | 5% | 2.7% | | | 2.7% | 4.1% | | | | | | | |
| 55 | Ref binder | — | 15 | 4.82 | 5% | 3.8% | | | 1.9% | 4.6% | | | | | | | |
| 56 | Ref binder | — | 15 | 4.45 | 5% | 6.6% | | | 1.4% | 2.2% | | | | | | | |
| 57 | Ref binder | — | 15 | 4.05 | | 4.1% | | | 2.7% | 5.3% | | | | | | | |
| 58 | Ref binder | — | 15 | 5.08 | | 5.3% | | | 2.2% | 4.1% | | | | | | | |

TABLE IV-continued

| Example | Resin | Ecotox | Thickness (μm) | $A_{380}$ | SC#1 | T384-2 | T479 | T477 | E109 | T400 | E-BL1B | T234 | T928 | T1130 | T−M | T−S | A+O |
|---|---|---|---|---|---|---|---|---|---|---|---|---|---|---|---|---|---|
| 59 | Ref binder | — | 15 | 6.32 | | 9.8% | | | | | | | | | | | |
| 60 | Ref binder | comply | 15 | 8.59 | | 2.6% | 2.6% | 2.6% | | | | | | | | | |
| 61 | Ref binder | comply | 15 | 5.42 | | 2.6% | | | 2.6% | 3.9% | | | | | | | |
| 62 | Ref binder | — | 15 | 5.85 | | 3.6% | | | 1.9% | 4.4% | | | | | | | |
| 63 | Ref binder | — | 15 | 5.40 | | 6.3% | | | 1.3% | 2.1% | | | | | | | |
| 64 | Ref binder | — | 15 | 4.92 | | 3.9% | | | 2.6% | 5.1% | | | | | | | |
| 65 | Ref binder | — | 15 | 6.17 | | 5.1% | | | 2.1% | 3.9% | | | | | | | |
| 66 | Ref binder | comply | 10 | 2.45 | | | 3.3% | | | | | | | | | | |
| 67 | Ref binder | — | 10 | 2.65 | | | | 5.4% | | | | | | | | | |
| 68 | Ref binder | — | 10 | 2.41 | | | | | 5.4% | | | | | | | | |
| 69 | Ref binder | — | 10 | 2.68 | | | | | | 6.7% | | | | | | | |
| 70 | Ref binder | — | 10 | 2.87 | | 6.7% | | | | | | | | | | | |
| 71 | Ref binder | — | 10 | 2.92 | | | | | | | | | 7.9% | | | | |
| 72 | Ref binder | comply | 10 | 3.21 | | 2.8% | 2.8% | | | | | | | | | | |
| 73 | Ref binder | comply | 10 | 3.01 | | 2.2% | 1.4% | 2.2% | | | | | | | | | |
| 74 | Ref binder | comply | 10 | 2.98 | | 2.8% | | | 2.2% | 2.2% | | | | | | | |
| 75 | Ref binder | — | 10 | 3.45 | | | | | | | | 6.7% | | | | | |
| 76 | Ref binder | comply | 10 | 3.86 | | | | | | | | | 7.9% | | | | |
| 77 | Ref binder | — | 10 | 2.45 | | | | | | | | | | | | | 5.4% |
| 78 | Ref binder | — | 10 | 2.65 | | | | | | | | | | 6.7% | | | |
| 79 | Ref binder | comply | 10 | 3.17 | | | | | | | | | | | | | 2.8% |
| 80 | Ref binder | comply | 10 | 2.64 | | | | | | 4.1% | 1.4% | | | | | | |
| 81 | Ref binder | comply | 10 | 3.09 | | | 2.8% | | | | 1.4% | | | | | | |
| 82 | Ref binder | comply | 10 | 3.39 | | | 2.8% | 2.8% | | | | | | | | | |
| 83 | Ref binder | comply | 10 | 2.56 | | | 1.4% | | | | | | 3.3% | | | | |
| 84 | Ref binder | comply | 10 | 2.38 | | | | | | 2.2% | | | 3.3% | | | | |
| 85 | Ref binder | comply | 10 | 2.60 | | | | 2.8% | | | | | 2.8% | | | | |
| 86 | Ref binder | comply | 10 | 3.07 | | 2.8% | | | | | | | 4.1% | | | | |
| 87 | Ref binder | comply | 10 | 2.73 | | 2.8% | | | | | | | | | | | 1.4% |
| 88 | Ref binder | comply | 12 | 5.56 | | 2.8% | | | | | | 6.7% | | | | | 0.0% |
| 89 | Ref binder | comply | 12 | 2.92 | | 2.8% | | | | | | | 2.8% | | | | |
| 90 | Ref binder | comply | 12 | 6.21 | | | | | | | | | 10.3% | | | | |
| 91 | Ref binder | comply | 12 | 5.14 | | | 1.4% | 1.4% | | | | | 5.4% | | | | |
| 92 | Ref binder | comply | 12 | 6.70 | | 2.8% | | | 2.8% | | | | | | | | 2.8% |
| 93 | Ref binder | comply | 12 | 6.85 | | 2.8% | | 2.8% | | | | | | | | | 2.8% |
| 94 | Ref binder | comply | 12 | 4.79 | | | | | 2.8% | | | 5.4% | | | | | |
| 95 | Ref binder | comply | 12 | 4.93 | | | | 2.8% | | | | 5.4% | | | | | |
| 96 | Ref binder | comply | 12 | 4.56 | | | | | 2.8% | | | | 5.4% | | | | |

TABLE IV-continued

| Example | Resin | Ecotox | Thickness (µm) | $A_{380}$ | SC#1 | T384-2 | T479 | T477 | E109 | T400 | E-BL1B | T234 | T928 | T1130 | T − M | T − S | A + O |
|---|---|---|---|---|---|---|---|---|---|---|---|---|---|---|---|---|---|
| 97 | Ref binder | comply | 12 | 4.70 | | | | 2.8% | | | | | 5.4% | | | | |
| 98 | Ref binder | — | 12 | 2.64 | | | | | | | | | | 10.3% | | | |
| 99 | Ref binder | — | 12 | 4.25 | | | | | 5.4% | | | | | 5.4% | | | |
| 100 | Ref binder | — | 12 | 5.57 | | 10.3% | | | | | | | | | | | |
| 101 | Ref binder | comply | 12 | 6.21 | | | | | | | | | 10.3% | | | | |
| 102 | Ref binder | comply | 12 | 4.54 | | 2.8% | | 2.8% | | | | | 2.8% | | | | |
| 103 | Ref binder | comply | 12 | 5.81 | | | | 5.4% | | 5.4% | | | | | | | |
| 104 | Ref binder | comply | 12 | 7.18 | | | | | 2.8% | 5.4% | | | 5.4% | | | | |
| 105 | Ref binder | — | 12 | 5.65 | | 7.9% | | | 2.8% | | | | | | | | |
| 106 | Ref binder | comply | 12 | 6.12 | | | | | 2.8% | | | | 7.9% | | | | |
| 107 | Ref binder | comply | 12 | 6.27 | | | | 2.8% | | | | | 7.9% | | | | |
| 108 | Ref binder | comply | 12 | 7.40 | | | 5.4% | 4.1% | | | | | | | | | |
| 109 | Ref binder | comply | 12 | 7.07 | | | | | 2.8% | | | 7.9% | 2.8% | | | | |
| 110 | Water-borne | comply | 10 | 2.45 | | | 3.3% | | | | | | | | | | |
| 111 | Water-borne | comply | 10 | 2.65 | | | | 5.4% | | | | | | | | | |
| 112 | Water-borne | comply | 10 | 2.41 | | | | | 5.4% | | | | | | | | |
| 113 | Water-borne | comply | 10 | 2.68 | | | | | | 6.7% | | | | | | | |
| 114 | Water-borne | — | 10 | 2.87 | | 6.7% | | | | | | | | | | | |
| 115 | Water-borne | comply | 10 | 3.39 | | | 2.8% | 2.8% | | | | | | | | | |
| 116 | Water-borne | comply | 10 | 3.21 | | 2.8% | 2.8% | | | | | | | | | | |
| 117 | Water-borne | comply | 10 | 3.01 | | 2.2% | 1.4% | 2.2% | | | | | | | | | |
| 118 | Water-borne | comply | 10 | 2.98 | | 2.8% | | | 2.2% | 2.2% | | | | | | | |
| 119 | Water-borne | comply | 10 | 2.56 | | | 1.4% | | | | | | 3.3% | | | | |
| 120 | Water-borne | comply | 10 | 2.38 | | | | | | 2.2% | | | 3.3% | | | | |
| 121 | Water-borne | comply | 10 | 2.60 | | | | 2.8% | | | | | 2.8% | | | | |
| 122 | Water-borne | comply | 10 | 3.07 | | 2.8% | | | | | | | 4.1% | | | | |
| 123 | Water-borne | comply | 10 | 2.73 | | 2.8% | | | | | | | | | | | 1.4% |
| 124 | Ref binder | — | 10 | 4.63 | | 10.3% | | | | | | | | | | | |
| 125 | Ref binder | comply | 10 | 5.15 | | | | | | | | | 10.3% | | | | |
| 126 | Ref binder | comply | 10 | 3.77 | | 2.8% | | 2.8% | | | | | 2.8% | | | | |
| 127 | Ref binder | comply | 10 | 4.82 | | | | 5.4% | | 5.4% | | | | | | | |
| 128 | Ref binder | comply | 10 | 5.96 | | | | | 2.8% | 5.4% | | | 5.4% | | | | |
| 129 | Ref binder | — | 10 | 4.69 | | 7.9% | | | 2.8% | | | | | | | | |
| 130 | Ref binder | comply | 10 | 5.08 | | | | | 2.8% | | | | 7.9% | | | | |
| 131 | Ref binder | comply | 10 | 5.20 | | | | 2.8% | | | | | 7.9% | | | | |
| 132 | Ref binder | comply | 10 | 6.15 | | | 5.4% | 4.1% | | | | | | | | | |
| 133 | Ref binder | comply | 10 | 5.87 | | | | | 2.8% | | | 7.9% | 2.8% | | | | |

Organic UV compounds used in examples 10-133 are referenced as follow:

one, α-isomethylionone, jasmone, oct-1-en-3-one, and their mixtures.

TABLE V

| Ref | Tradename | CAS | Molecule active |
|---|---|---|---|
| T384-2 | Tinuvin 384-2 | 127519-17-9 | Benzenepropanoic acid, 3-(2H-benzotriazol-2-yl)-5-(1,1-dimethylethyl)-4-hydroxy-, C7-9-branched and linear alkyl esters |
| T477 | Tinuvin 477 | — | 1-isoctyloxycarbonyl ethylated 2,4,6 tris (2,4-hydroxyphenyl)-1,3,5 triazine derivatives |
| T479 | Tinuvin 479 | — | Hydroxyphenyl-triazine |
| T234 | Tinuvin 900 | 70321-86-7 | 2-(2H-benzotriazol-2-yl)-4, 6-bis (1-methyl-1-phenylethyl)phenol |
| T928 | Tinuvin 928 | 73936-91-1 | 2-(2H-Benzotriazol-2-yl)-6-(1-methyl-1-phenylethyl)-4-(1,1,3,3-tetramethylbutyl)phenol |
| T1130 | Tinuvin 1130 | 104810-47-1 | β-[3-(2-H-Benzotriazole-2-yl)-4-hydorxy-5-tert.butylphenyl]-propionic acid-poly(ethylene glycol) 300-ester/Bis{β-[3-(2-H-Benzotriazole-2-yl)-4-hydroxy-5tert.butylphenyl]-propionic acid}-poly (ethylene glycol) 300-ester |
| T400 | Tinuvin 400 | 153519-44-9 | 1,3-Benzenediol, 4-[4,6-bis(2,4-dimethylphenyl)-1,3,5-triazin-2-yl] |
| E109 | Eversorb 109 | 83044-89-7/ 83044-90-0 | Octyl 3-[3-tert-butyl-4-hydroxy-5-(5-chloro-2H-benzotriazol-2-yl)phenyl]propionate |
| E-BL1B | Eversorb BL1B | 131-55-5 | 2,2',4,4'-Tetrahydroxybenzo-phenone |
| A + O | Parsol Guard | 70356-09-1/ 6197-30-4 | 1,3-Propanedione, 1-[4-(1,1-dimethylethyl)phenyl]-3-(4-methoxyphenyl)/ 2-cyano-3,3-diphenylacrylatede 2-éthylhexyle |
| T − M | Tinosorb M | 103597-45-1 | 2,2'-methylenebis(6-(2H-benzotriazol-2-yl)-4-(1,1,3,3-tetramethylbutyl)phenol) |
| T − S | Tinosorb S | 187393-00-6 | 5-[(2-ethylhexyl)oxy]-2-(4-{4-[(2-ethylhexyl)oxy]-2-hydroxyphenyl}-6-(4-methoxyphenyl)-1,3,5-triazin-2-yl)phenol |

The invention claimed is:

1. A perfume bottle comprising
a glass container,
a fragrancing composition in the glass container, said fragrancing composition comprising at least:
   i. 100 ppm of aroma compounds having an α,β-unsaturated carbonyl functional group, or
   ii. 50 ppm of aroma compounds being conjugated terpenes or conjugated terpenoids
a filtering film on the glass container, said filtering film comprising compounds absorbing UV-light in a range from 300 nm to 380 nm and a binder, wherein the weighted mean absorbance $A_{380}$ of the filtering film is greater than 2 with $A_{380}$ defined by the following relation:

$$A_{380} = \frac{\int_{300}^{380} W(\lambda)A(\lambda)d\lambda}{\int_{300}^{380} W(\lambda)d\lambda}$$

where A(λ) represents the absorbance of the filtering film at a given wavelength, and W(λ) represents a weighting function equal to the product of the solar spectrum irradiance $E_S(\lambda)$ and a sensitivity function S(λ) defined as a gaussian function with the peak centered at 300 nm and a standard deviation of 24 nm.

2. The perfume bottle according to claim 1, wherein the aroma compound having an α,β unsaturated carbonyl functional group is selected from the group consisting of cinnamaldehyde, α-amylcinnamaldehyde, α-hexylcinnamaldehyde, citral, 4-anisaldehyde, benzaldehyde, 4-isopropylbenzaldehyde, piperonal, vanillin, carvone, α-damascone, β-damascenone, α-ionone, β-ionone, γ-ion- 3. The perfume bottle according to claim 1, wherein the aroma compound having an α,β unsaturated carbonyl functional group is selected from the group consisting of citral, α-damascone, α-isomethylionone, β-ionone, cinnamaldehyde, or wherein the aroma compound being conjugated terpenes or conjugated terpenoids is selected from the group consisting of α-farnesene, germacrene D, α-phellandrene.

4. The perfume bottle according to claim 1, wherein the fragrancing composition comprises less than 500 ppm of photo stabilizers.

5. The perfume bottle according to claim 1, wherein the concentration of α,β-unsaturated carbonyl functional groups in the fragrancing composition is greater than or equal to 0.05 mmol·kg$^{-1}$.

6. The perfume bottle according to claim 1, wherein the concentration of unsaturations in conjugated terpenes or conjugated terpenoids in the fragrancing composition is greater than or equal to 0.03 mmol·kg$^{-1}$.

7. The perfume bottle according to claim 1, wherein the weighted mean absorbance $A_{340}$ of the filtering film is greater than 2 with $A_{340}$ defined by the following relation:

$$A_{340} = \frac{\int_{300}^{340} W(\lambda)A(\lambda)d\lambda}{\int_{300}^{340} W(\lambda)d\lambda}.$$

8. The perfume bottle according to claim 1, wherein the compounds absorbing UV-light comprise semi-conductive nanoparticles having a formula MxEy              (I), wherein:

M is selected from the group consisting of Zn, Cd, Hg, Cu, Ag, Al, Ga, In, Si, Ge, Sn, Pb and a mixture thereof;

E is selected from the group consisting of S, Se, Te, N, P, As, Sb, and a mixture thereof;

x and y are independently a decimal number from 0.5 to 5.

9. The perfume bottle according to claim 8, wherein the semi-conductive nanoparticles in the filtering film are present in an amount that is in a range from 0.05 wt % to 15 wt %, based on the weight of the filtering film, for a 10 μm-thick film.

10. The perfume bottle according to claim 1, wherein the compounds absorbing UV-light comprise organic anti-UV compounds selected from the group consisting of benzotriazoles, triazines, piperidines, benzophenones, catechol, their derivatives, and mixtures thereof.

11. The perfume bottle according to claim 10, wherein the organic compounds absorbing UV-light in the filtering film are present in an amount that is in a range from 2 wt % to 25 wt %, based on the weight of the filtering film, for a 10 μm-thick film.

12. The perfume bottle according to claim 1, wherein the filtering film is transparent.

13. The perfume bottle according to claim 1, wherein the filtering film is transparent and uncoloured.

14. The perfume bottle according to claim 1, wherein the perfume bottle is transparent.

15. The perfume bottle according to claim 1, wherein the perfume bottle is transparent and uncoloured.

16. The perfume bottle according to claim 1, wherein the difference of lightness between the perfume bottle and the container is lower than 5.

17. The perfume bottle according to claim 1, wherein the difference of lightness between the perfume bottle and the container is lower than 5, and the Chroma of the perfume bottle is lower than 60.

18. The perfume bottle according to claim 1, wherein the difference of lightness between the perfume bottle and the container is lower than 5, and the Chroma of the perfume bottle is lower than 50.

19. The perfume bottle according to claim 1, wherein the fragrancing composition is a perfume, an esprit de parfum, an eau de parfum, or an eau de toilette.

20. The perfume bottle according to claim 1, wherein the weighted mean absorbance $A_{380}$ of the filtering film is greater than 2.5.

* * * * *